(12) United States Patent
Sinha

(10) Patent No.: US 9,494,705 B2
(45) Date of Patent: Nov. 15, 2016

(54) CASED-HOLE RADIAL PROFILING OF SHEAR PARAMETERS FROM SONIC MEASUREMENTS

(75) Inventor: Bikash K. Sinha, Cambridge, MA (US)

(73) Assignee: Schlumberger Technology Corporation, Houston, TX (US)

(*) Notice: Subject to any disclaimer, the term of this patent is extended or adjusted under 35 U.S.C. 154(b) by 911 days.

(21) Appl. No.: 13/572,699

(22) Filed: Aug. 13, 2012

(65) Prior Publication Data

US 2014/0043938 A1 Feb. 13, 2014

(51) Int. Cl.
*G01V 1/50* (2006.01)
*G01V 1/28* (2006.01)

(52) U.S. Cl.
CPC *G01V 1/50* (2013.01); *G01V 1/284* (2013.01)

(58) Field of Classification Search
CPC .................................. G01V 1/284; G01V 1/50
USPC ........................................................ 367/31, 32
See application file for complete search history.

(56) References Cited

U.S. PATENT DOCUMENTS

| | | | |
|---|---|---|---|
| 6,308,137 B1 | 10/2001 | Underhill et al. |
| 6,611,761 B2 | 8/2003 | Sinha et al. |
| 2009/0032250 A1 | 2/2009 | Sarkar et al. |
| 2009/0145600 A1 | 6/2009 | Wu et al. |
| 2010/0263931 A1 | 10/2010 | Prasad et al. |
| 2011/0042080 A1 | 2/2011 | Birchwood et al. |
| 2011/0154895 A1 | 6/2011 | Charara et al. |

OTHER PUBLICATIONS

Ekstrom, M.E., 1995, "Dispersion estimation from borehole acoustic arrays using a modified matrix pencil algorithm", Proceedings of the 29th Asilomar Conference on Signals, Systems and Computers, IEEE Computer Society, 449-553.
G. Buckus, F. Gilbert, Uniqueness in the inversion of inaccurate gross Earth data: Phil. Trans. Roy. Soc. (London), 1970, vol. A266, pp. 123-192.
H. Braunisch, T.M. Habashy, B.K. Sinha, J. Pabon, J.A. Kong, "Inversion of guided-wave dispersion data with application to borehole acoustics", J. Acoust. Soc. Am., 2004, 115 (1), pp. 269-279.
B.K. Sinha, "Sensitivity and inversion of borehole flexural dispersion for formation parameters", Geophysical Journal International, 1997. pp. 84-96.

(Continued)

*Primary Examiner* — Daniel L Murphy
(74) *Attorney, Agent, or Firm* — Daryl R. Wright; Jody Lynn DeStefanis

(57) ABSTRACT

Cased-hole radial profiling of shear parameters from sonic measurements is disclosed. Example methods disclosed herein include determining a variation of a first shear modulus at a first radial position from a cased borehole in a formation based on a first weighted average of fractional variations of Stoneley wave velocities for different wavenumbers, the first weighted average based on first weights determined using a perturbation model including parameters to model the borehole casing, and determining variations of second and third shear moduli at respective second and third radial positions from the borehole based on second and third weighted averages of fractional variations of respective first and second flexural wave velocities for different wavenumbers, the first and second flexural wave velocities associated with respective first and second orthogonal borehole axial planes of the formation, the second and third weighted averages based on respective second and third weights determined using the perturbation model.

18 Claims, 25 Drawing Sheets

(56) References Cited

OTHER PUBLICATIONS

International Search Report and Written Opinion for the equivalent PCT patent application No. PCT/US2013/054598 issued on Nov. 4, 2013.
Breton et al., "Well-Positioned Seismic Measurements", Oilfield Review, Schlumberger, vol. 14, No. 1, Spring 2002, pp. 32-45.
Pistre et al., "A New Modular Sonic Tool Provides Complete Acoustic Formation Characterization", 2005 Society of Exploration Geophysicists International Exposition and Annual Meeting Proceedings, SEG, Houston, TX, Nov. 3-11, 2005, pp. 368-372.

CASED-HOLE RADIAL PROFILING OF SHEAR PARAMETERS FROM SONIC MEASUREMENTS

FIELD OF THE DISCLOSURE

This disclosure relates generally to sonic measurement processing and, more particularly, to cased-hole radial profiling of shear parameters from sonic measurements.

BACKGROUND

Many production and observation wells have boreholes that are cased. Thus, monitoring changes in formation stresses caused by either depletion or injection of fluids at such wellsites may involve analyzing and inverting sonic data acquired in cased boreholes. However, the characteristics of the sonic data acquired at an array of receivers in a cased borehole can be affected by the quality of bonds between the steel casing and cement annulus, as well as the bonds between the cement annulus and the formation. As such, the processing and interpretation of sonic data obtained from cased boreholes can be more challenging than in open holes because of for example, interference from the casing arrivals, reduced sensitivity of sonic velocities to changes in formation properties, etc.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The disclosure relates generally to sonic measurement processing and, more particularly, to cased-hole radial profiling of shear parameters from sonic measurements. Disclosed example methods to determine a radial profile of shear parameters for a formation having a cased borehole include determining a fractional variation of a first shear modulus at a first radial position from the borehole based on a first weighted average of fractional variations of Stoneley wave velocities for different wavenumbers. In some such examples, the first weighted average is based on first weights determined using a perturbation model including parameters to model the borehole casing. Some such example methods also include determining fractional variations of second and third shear moduli at respective second and third radial positions from the borehole based on second and third weighted averages of fractional variations of respective first and second flexural wave velocities for different wavenumbers. In some such examples, the first and second flexural wave velocities are associated with respective first and second orthogonal borehole axial planes of the formation. Furthermore, in some such examples, the second and third weighted averages are based on respective second and third weights determined using the perturbation model.

Disclosed example systems to determine a radial profile of shear parameters for a formation having a cased borehole includes an example sonic tool to measure Stoneley waveforms and dipole sonic waveforms in the cased borehole. Some such example systems also include an example radial profiling processor to determine a first radial profile for variations of a first shear modulus at a first set of radial positions from the borehole in a borehole cross-sectional plane of the formation. In some such examples, the first radial profile is determined based on a first weighted average of fractional variations of Stoneley wave velocities for different wavenumbers. Also, in some such examples, the first weighted average is based on first weights determined using a perturbation model including parameters to model the borehole casing. In some example systems, the example radial profiling processor further is to determine respective second and third radial profiles of respective second and third shear moduli at respective second and third sets of radial positions from the borehole in respective first and second orthogonal borehole axial planes of the formation. In some such examples, the second radial profile is determined based on a second weighted average of fractional variations of first flexural wave velocities for different wavenumbers, and the third radial profile is determined based on a third weighted average of fractional variations of second flexural wave velocities for different wavenumbers. Also, in some such examples, the second and third weighted averages are based on respective second and third weights determined using the perturbation model. Furthermore, in some such examples, the first flexural wave velocities are associated with the first borehole axial plane of the formation, and the second flexural wave velocities are associated with the second borehole axial plane of the formation.

Disclosed example machine readable storage medium include example machine readable instructions which, when executed, cause an example machine to at least determine a fractional variation of a first shear modulus at a first radial position from a cased borehole in a formation based on a first weighted average of fractional variations of Stoneley wave velocities for different wavenumbers. In some such examples, the first weighted average is based on first weights determined using a perturbation model including parameters to model the borehole casing. Also, in some such examples, the example instructions, when executed, further cause the example machine to determine fractional variations of second and third shear moduli at respective second and third radial positions from the borehole based on second and third weighted averages of fractional variations of respective first and second flexural wave velocities for different wavenumbers. In some such examples, the first and second flexural wave velocities are associated with respective first and second orthogonal borehole axial planes of the formation. Also, in some such examples, the second and third weighted averages are based on respective second and third weights determined using the perturbation model.

BRIEF DESCRIPTION OF THE DRAWINGS

Example methods, apparatus, systems and articles of manufacture for cased-hole radial profiling of shear parameters from sonic measurements are described with reference to the following figures. Where possible, the same numbers are used throughout the figures to reference like features and components.

DETAILED DESCRIPTION

In the following detailed description, reference is made to the accompanying drawings, which form a part hereof, and within which are shown by way of illustration specific embodiments by which the invention may be practiced. It is to be understood that other embodiments may be utilized and structural changes may be made without departing from the scope of the disclosure.

Example methods, apparatus, systems and articles of manufacture (e.g., storage media) to implement techniques for cased-hole radial profiling of shear parameters from sonic measurements are disclosed herein. Such example techniques can, for example, estimate radial variation of the shear modulus in a borehole cross-sectional plane from measured Stoneley dispersion in a cased borehole. Such example techniques can also estimate radial variations of shear moduli in the two orthogonal borehole axial planes from measured cross-dipole dispersions. Generally, dispersion refers to the phenomenon of wave velocity dependence on frequency or, equivalently, wavenumber. Because the cement annulus surrounding the cased borehole may be of irregular thickness, the disclosed example techniques for cased-hole radial profiling consider the annulus to be a part of the near-wellbore alteration outside the casing surface. Consequently, the disclosed example cased-hole radial profiling techniques account for the effect of a steel casing (e.g., such as a steel pipe) on measured borehole dispersions by incorporating the steel casing in a reference dispersion and inverting differences between the measured and reference dispersions to obtain radial variations in the formation shear slownesses.

As described in greater detail below, computational results on several synthetic data sets indicate that radial profiles of the Stoneley and dipole shear slownesses can be reliably obtained in cased boreholes surrounded by fast formations in which the casing and cement annulus are well bonded, and in which the cement annulus and the formation are well bonded. Radial profiles of the three shear slownesses provide the far-field shear slownesses that can be readily transformed into radial profiles of the three shear moduli.

Using the example cased-hole radial profiling techniques disclosed herein, changes in the radial variation of shear moduli caused by hydraulic fracturing of tight formations can be determined and used to estimate the width of vertical fractures that are identified by monitoring changes in the cross-dipole shear slowness or energy anisotropy. Radial profiles of the three shear moduli determined in accordance with the example cased-hole radial profiling techniques disclosed herein can also be used to estimate changes in the far-field shear slownesses related to changes in the reservoir stresses caused by either depletion or injection of fluids into a permeable reservoir.

Figure 1:
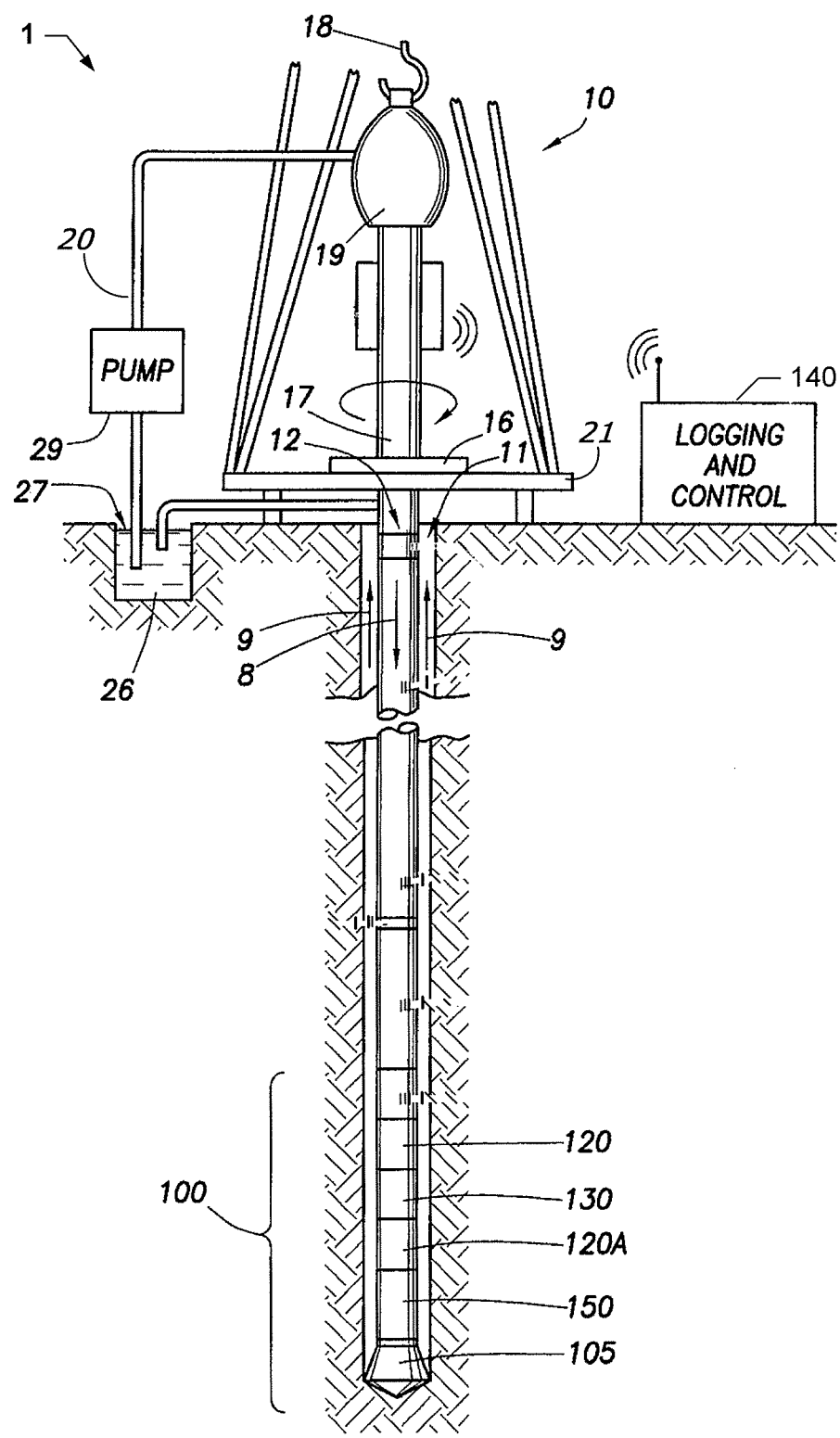
FIG. 1 is a diagram illustrating an example wellsite system capable of supporting cased-hole radial profiling of shear parameters from sonic measurements as disclosed herein.

Turning to the figures, FIG. 1 illustrates an example wellsite system 1 in which one or more of the disclosed example methods, apparatus, systems and/or articles of manufacture for cased-hole radial profiling of shear parameters from sonic measurements can be employed. The wellsite can be onshore or offshore. In this example system, a borehole 11 is formed in subsurface formations by rotary drilling, whereas other example systems can use directional drilling.

A drillstring 12 is suspended within the borehole 11 and has a bottom hole assembly 100 that includes a drill bit 105 at its lower end. The surface system includes platform and derrick assembly 10 positioned over the borehole 11, the assembly 10 including a rotary table 16, kelly 17, hook 18 and rotary swivel 19. In an example, the drill string 12 is suspended from a lifting gear (not shown) via the hook 18, with the lifting gear being coupled to a mast (not shown) rising above the surface. An example lifting gear includes a crown block whose axis is affixed to the top of the mast, a vertically traveling block to which the hook 18 is attached, and a cable passing through the crown block and the vertically traveling block. In such an example, one end of the cable is affixed to an anchor point, whereas the other end is affixed to a winch to raise and lower the hook 18 and the drillstring 12 coupled thereto. The drillstring 12 is formed of drill pipes screwed one to another.

The drillstring 12 may be raised and lowered by turning the lifting gear with the winch. In some scenarios, drill pipe raising and lowering operations involve unhooking the drillstring 12 temporarily from the lifting gear. In such scenarios, the drillstring 12 can be supported by blocking it with wedges in a conical recess of the rotary table 16, which is mounted on a platform 21 through which the drillstring 12 passes.

In the illustrated example, the drillstring 12 is rotated by the rotary table 16, energized by means not shown, which engages the kelly 17 at the upper end of the drillstring 12. The drillstring 12 is suspended from the hook 18, attached to a traveling block (also not shown), through the kelly 17 and the rotary swivel 19, which permits rotation of the drillstring 12 relative to the hook 18. In some examples, a top drive system could be used.

In the illustrated example, the surface system further includes drilling fluid or mud 26 stored in a pit 27 formed at the well site. A pump 29 delivers the drilling fluid 26 to the interior of the drillstring 12 via a hose 20 coupled to a port in the swivel 19, causing the drilling fluid to flow downwardly through the drillstring 12 as indicated by the directional arrow 8. The drilling fluid exits the drillstring 12 via ports in the drill bit 105, and then circulates upwardly through the annulus region between the outside of the drillstring and the wall of the borehole, as indicated by the directional arrows 9. In this manner, the drilling fluid lubricates the drill bit 105 and carries formation cuttings up to the surface as it is returned to the pit 27 for recirculation.

The bottom hole assembly 100 includes one or more specially-made drill collars near the drill bit 105. Each such drill collar has one or more logging devices mounted on or in it, thereby allowing downhole drilling conditions and/or various characteristic properties of the geological formation (e.g., such as layers of rock or other material) intersected by the borehole 11 to be measured as the borehole 11 is deepened. In particular, the bottom hole assembly 100 of the illustrated example system 1 includes a logging-while-drilling (LWD) module 120, a measuring-while-drilling (MWD) module 130, a roto-steerable system and motor 150, and the drill bit 105.

The LWD module 120 is housed in a drill collar and can contain one or a plurality of logging tools. It will also be understood that more than one LWD and/or MWD module can be employed, e.g. as represented at 120A. (References, throughout, to a module at the position of 120 can mean a module at the position of 120A as well.) The LWD module 120 includes capabilities for measuring, processing, and storing information, as well as for communicating with the surface equipment.

The MWD module 130 is also housed in a drill collar and can contain one or more devices for measuring characteristics of the drillstring 12 and drill bit 105. The MWD module 130 further includes an apparatus (not shown) for generating electrical power to the downhole system. This may include a mud turbine generator powered by the flow of the drilling fluid, it being understood that other power and/or battery systems may be employed. In the illustrated example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

The wellsite system 1 also includes a logging and control unit 140 communicably coupled in any appropriate manner to the LWD module 120/120A and the MWD module 130. In the illustrated example, the LWD module 120/120A and/or the MWD module 130, in conjunction with the logging and control unit 140, collectively implement cased-hole radial profiling of shear parameters from sonic measurements in accordance with the examples disclosed herein. For example, the LWD module 120/120A and/or the MWD module 130 may include an example sonic measurement device, which is described in greater detail below, that is to provide sonic waveforms to the logging and control unit 140. The logging and control unit 140, in turn, may include an example radial profiling processor, which is described in greater detail below, that is to perform cased-hole radial profiling of shear parameters based on the sonic waveforms received from the LWD module 120/120A and/or the MWD module 130. Also, although some of the example cased-hole radial profiling techniques disclosed herein are described in the context of LWD and MWD applications, the disclosed example cased-hole radial profiling techniques are not limited thereto. Instead, cased-hole radial profiling as disclosed herein can also be used in other applications, such as wireline logging, production logging, permanent logging, formation evaluation, sampling-while-drilling, etc.

Figure 2A:
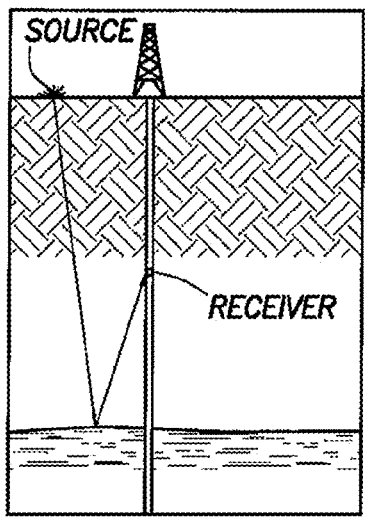
FIG. 2 is a diagram illustrating example seismic-while-drilling tools that may be used to implement the wellsite system of FIG. 1.
Figure 2B:
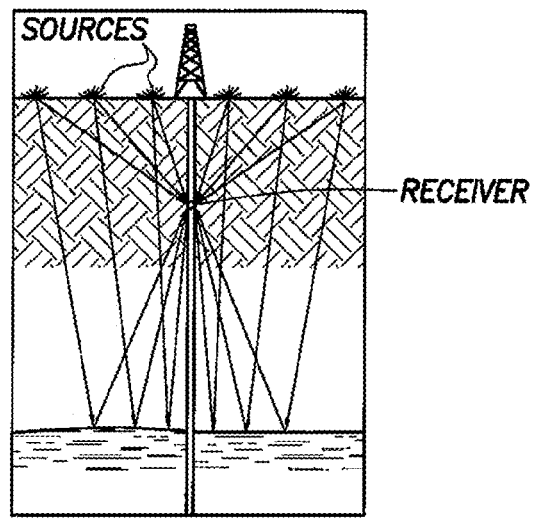
Figure 2C:
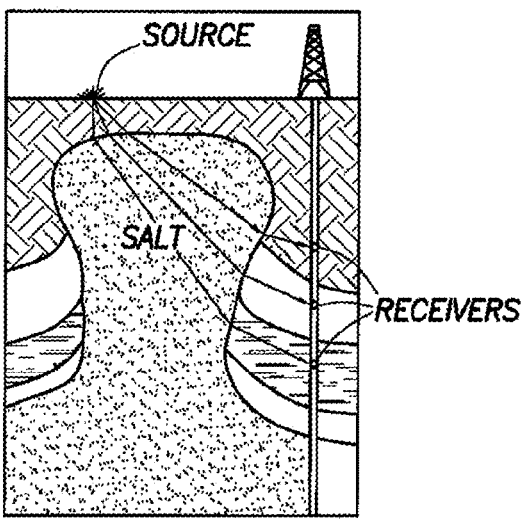
Figure 2D:
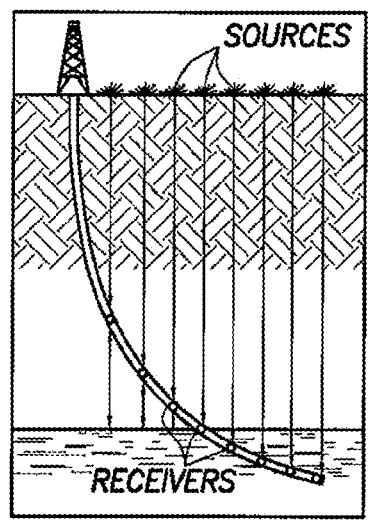
Figure 3:
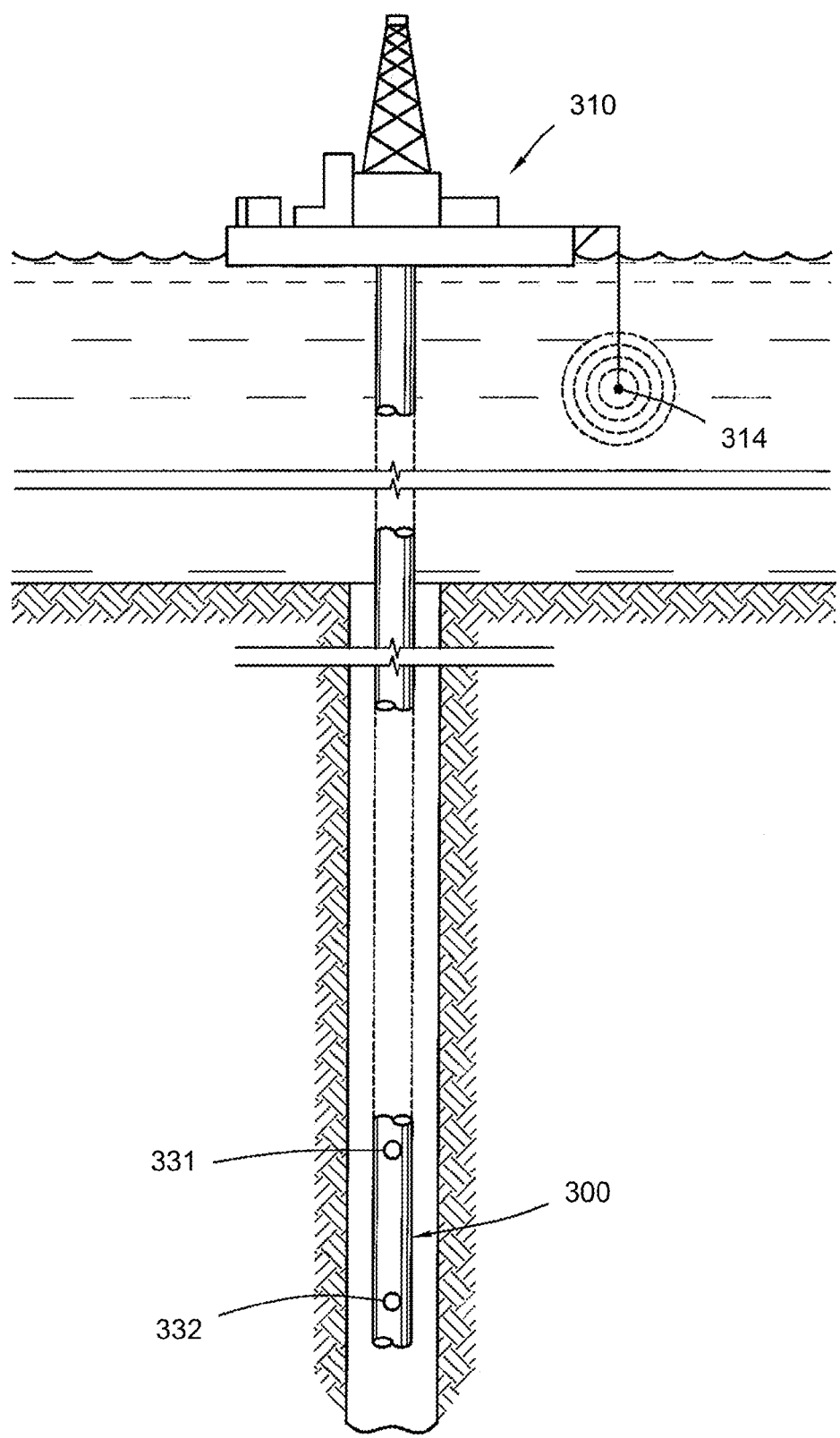
FIG. 3 is a diagram illustrating an example sonic-while-drilling tool that may be used to implement the wellsite system of FIG. 1.

For example, FIGS. 2A-D illustrate example seismic-while-drilling tools that can correspond to the LWD tool 120, or can be a part of an LWD tool suite 120A of the type disclosed in P. Breton et al., "Well Positioned Seismic Measurements," Oilfield Review, pp. 32-45, Spring, 2002, incorporated herein by reference. The downhole LWD module 120/120A can have a single receiver (as depicted in FIGS. 2A and 2B), or multiple receivers (as depicted in FIGS. 2C and 2D), and can be employed in conjunction with a single seismic source at the surface (as depicted in FIGS. 2A and 2C) to support monopole acoustic logging or plural seismic sources at the surface (as depicted in FIGS. 2B and 2D) to support multipole (e.g., dipole) acoustic logging. Accordingly, FIG. 2A, which includes reflection off a bed boundary, and is called a "zero-offset" vertical seismic profile arrangement, uses a single source and a single receiver; FIG. 2B, which includes reflections off a bed boundary, and is called a "walkaway" vertical seismic profile arrangement, uses multiple sources and a single receiver; FIG. 2C, which includes refraction through salt dome boundaries, and is called a "salt proximity" vertical seismic profile, uses a single source and multiple receivers; and FIG. 2D, which includes some reflections off a bed boundary, and is called a "walk above" vertical seismic profile, uses multiple sources and multiple receivers FIG. 3 illustrates a sonic logging-while-drilling tool that can correspond to the LWD tool 120, or can be a part of an LWD tool suite 120A of the type described in U.S. Pat. No. 6,308,137, incorporated herein by reference. In the illustrated example of FIG. 3, an offshore rig 310 is employed, and a sonic transmitting source or array 314 is deployed near the surface of the water. Alternatively, any other suitable type of uphole or downhole source or transmitter can be provided. An uphole processor controls the firing of the transmitter 314. The uphole equipment can also include acoustic receivers and a recorder for capturing reference signals near the source. The uphole equipment further includes telemetry equipment for receiving MWD signals from the downhole equipment. The telemetry equipment and the recorder are coupled to a processor so that recordings may be synchronized using uphole and downhole clocks. The downhole LWD module 300 includes at least acoustic receivers 331 and 332, which are coupled to a signal processor so that recordings may be made of signals detected by the receivers in synchronization with the firing of the signal source.

Figure 4:
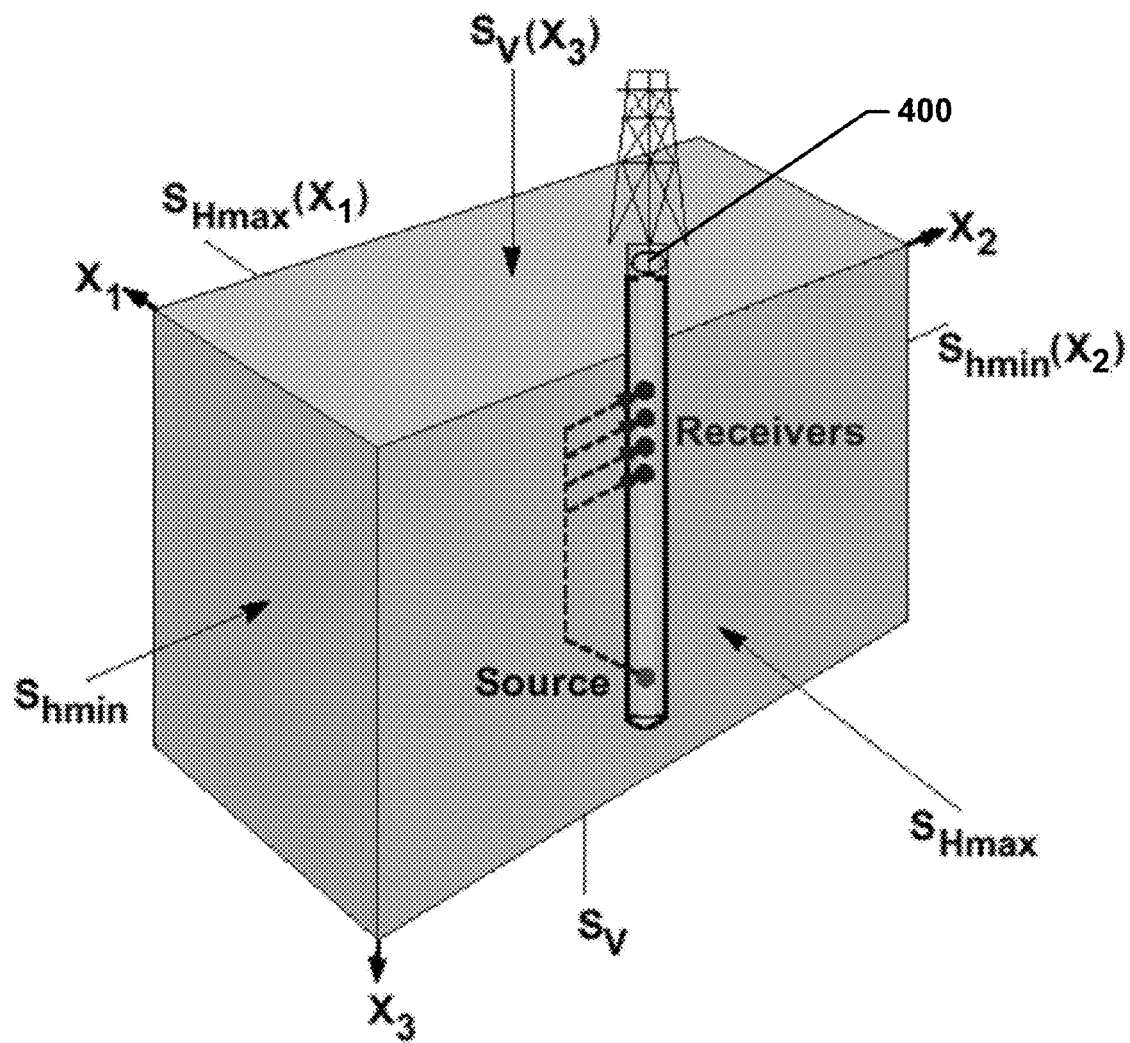
FIG. 4 is a diagram illustrating an example vertical borehole subject to overburden, maximum horizontal and minimum horizontal stresses parallel to the respective X3, X1 and X2 directions depicted in the figure.

In some examples, reservoir depletion and subsequent fluid (e.g., water and/or carbon dioxide) injection for enhanced oil recovery cause changes in the reservoir pressure and formation stresses, as shown in FIG. 4. FIG. 4 illustrates an example vertical borehole 400 subject to overburden ($S_V$), maximum horizontal ($S_{Hmax}$) and minimum horizontal ($S_{Hmin}$) stresses parallel to the respective X3, X1 and X2 directions depicted in the figure. Large stress changes can lead to activation of pre-existing faults and cap rock fractures, which can lead to unwanted carbon dioxide ($CO_2$) leakage. Time-lapse seismic surveys can detect impedance changes on the order of 3 to 9% in $CO_2$ saturated rocks, and can be good indicators of qualitative changes in the reservoir pressure and saturation. Small sonic velocity changes can be related to changes in in-situ stresses and fluid mobility caused by either reservoir depletion or injection. Reliable estimates of these changes can be used to maintain reservoir integrity and safe sequestration of injected carbon dioxide. Radial variations of shear slownesses outside the casing, as determined in accordance with the disclosed example techniques, can provide estimates of changes in reservoir stresses caused by fluid depletion or injection. Furthermore, changes in the radial variation of dipole shear moduli caused by hydraulic fracturing can be used to estimate the radial width of vertical fractures that are detected by the observed cross-dipole shear slowness anisotropy.

Figure 5:
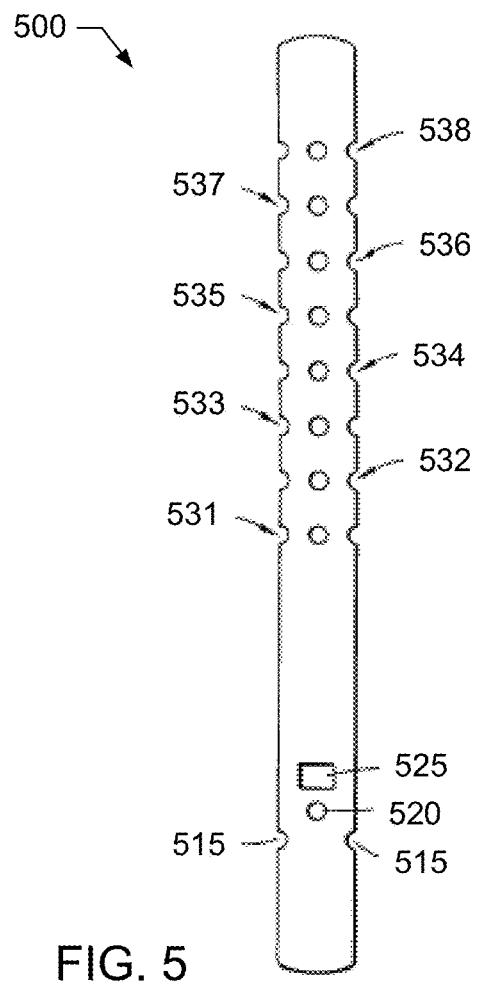
FIG. 5 is a diagram illustrating an example type of sonic measurement device that may be used to implement the example tools in FIGS. 1-4.
Figure 6:
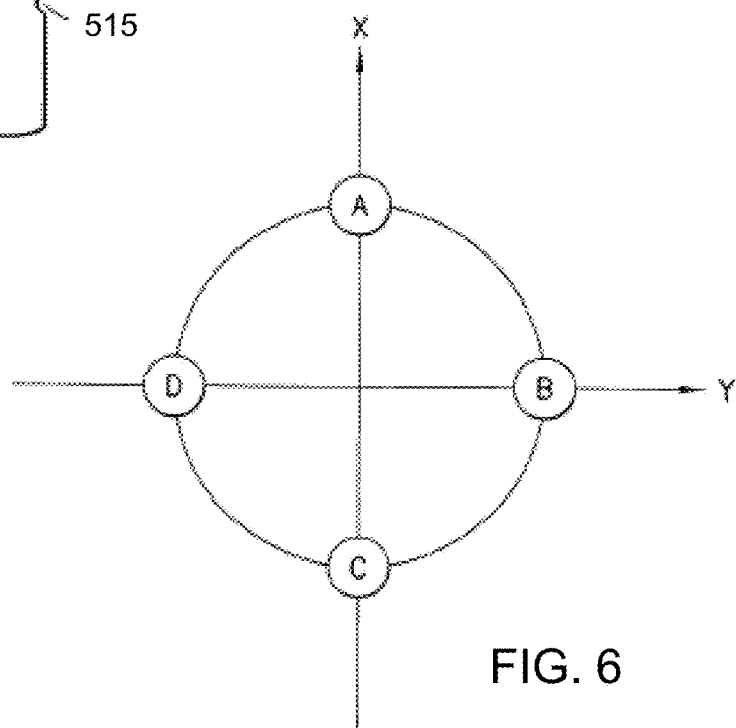
FIG. 6 is a diagram illustrating, in cross-section, an example placement of hydrophones that can be used to implement the receiver array of the example sonic measurement device of FIG. 5.

An example sonic measurement device 500 that may be included in the LWD module 120/120A and/or the MWD module 130 to provide sonic measurements for use in cased-hole radial profiling of shear parameters as disclosed herein is illustrated in FIGS. 5 and 6. The sonic measurement device 500 may be, for example, a Sonic Scanner™ tool from Schlumberger, which is generally described in Pistre et al., "A New Sonic Modular Tool Provides Complete Acoustic Formation Characterization", 2005 Society of Exploration Geophysicists International Exposition and Annual Meeting Proceedings, SEG, Houston, Nov. 6-11, 2005. However, any suitable logging device can be utilized to provide sonic measurements for cased-hole radial profiling of shear parameters as disclosed herein. The example sonic measurement device 500 of FIG. 5 includes crossed dipole transmitters 515 and 520 (where one end of the dipole transmitter 520 is visible in FIG. 5) and a monopole transmitter 525, so that waves including compressional, shear, Stoneley, and flexural modes can be excited. The example sonic measurement device 500 of FIG. 6 also includes eight, or some other suitable number, of spaced-apart receiver stations, designated 531 through 538 in the FIG. 5, which in the illustrated example each include four receiver hydrophones mounted azimuthally at ninety degree intervals in the surface of the cylindrical logging device. FIG. 6 shows four such example hydrophones, designated A, B, C, and D, for one of the example receiver stations 531-538. In the illustrated example if FIG. 6, a dipole measurement on one direction (e.g., an X component) can be obtained by subtracting the signals received at A and C (e.g., A-C), and a dipole measurement in another, orthogonal direction (e.g., a Y component) can be obtained by subtracting the signals received at B and D (e.g., B-D). With four receiver elements at each receiver station 531-538, there are a total of thirty two receiver elements in the illustrated example of FIGS. 5-6. In the illustrated example, the receiver stations 531-538 are also configurable for monopole reception.

An acoustic source, such as the transmitters 515, 520 and/or 525 of the sonic measurement device 500, in a fluid-filled borehole generates headwaves, as well as relatively stronger borehole-guided modes. A sonic measurement device, such as the device 500, includes a piezoelectric source (e.g., the transmitters 515, 520 and/or 525) and an array of hydrophone receivers (e.g., the receivers 531-538) inside a fluid-filled borehole. The piezoelectric source is configured in the form of, for example, a monopole source, a dipole source, etc., or any combination thereof. The source bandwidth ranges from, for example, a 0.5 to 20 kHz. A monopole source generates primarily the lowest-order axisymmetric mode, also referred to as the Stoneley mode, together with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis.

An incident compressional wave in the borehole fluid produces critically refracted compressional waves in the formation. Those refracted along the borehole surface are known as compressional headwaves. The critical incidence angle is $\theta_i = \sin^{-1}(V_f/V_c)$, where $V_f$ is the compressional wave speed in the borehole fluid, and $V_c$ is the compressional wave speed in the formation. As the compressional headwave travels along the interface, it radiates energy back into the fluid that can be detected by hydrophone receivers placed in the fluid-filled borehole. In fast formations, the shear headwave can be similarly excited by a compressional wave at the critical incidence angle of $\theta_i = \sin^{-1}(V_f/V_s)$, where $V_s$ is the shear wave speed in the formation. Headwaves are excited when the wavelength of the incident wave is smaller than the borehole diameter so that the boundary can be effectively treated as a planar interface.

In a homogeneous and isotropic model of fast formations, compressional and shear headwaves can be generated by a monopole source placed in a fluid-filled borehole for determining the formation compressional and shear wave speeds. However, refracted shear headwaves cannot be detected in slow formations (e.g., where the shear wave velocity is less than the borehole-fluid compressional velocity) with receivers placed in the borehole fluid. In slow formations, formation shear velocities are obtained from the low-frequency asymptote of flexural dispersion. There are standard processing techniques for the estimation of formation shear velocities in either fast or slow formations from an array of recorded dipole waveforms.

Similar measurements in cased boreholes encounter additional challenges because of the presence of a steel casing bonded to a cement annulus, which is bonded to the formation. The steel casing, such as a thick steel pipe, is a strong waveguide and its associated modes interact with the formation modes. Consequently, processing of sonic data acquired in cased holes generally involves removal of the casing arrival from the compressional headwave processing. Furthermore, inversion of the Stoneley and dipole dispersions generally involves accounting for the presence of the steel casing and near-wellbore alteration caused by the cement annulus, as well as possible mechanical damage to the formation.

Figure 7:
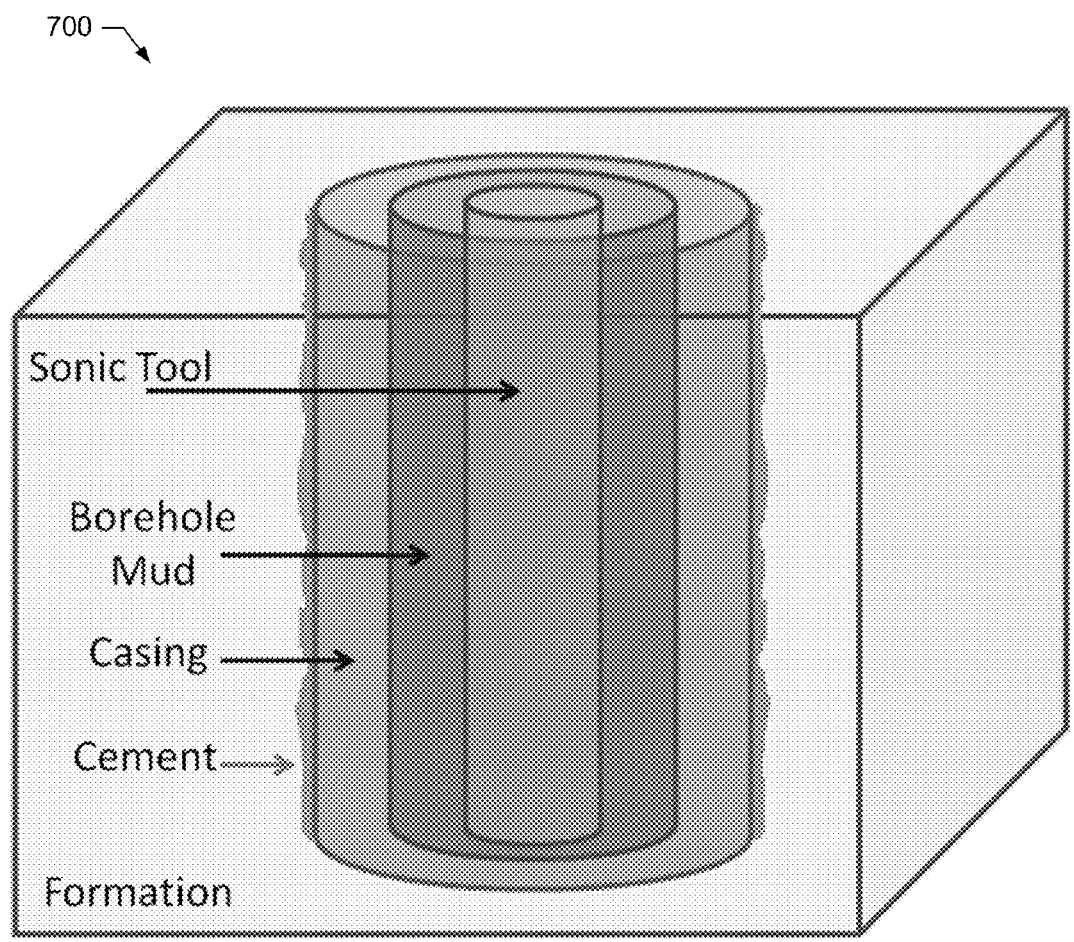
FIG. 7 is a diagram illustrating an example model of a sonic tool in a cased borehole that may be used to model the effects of the example tools of FIGS. 1-6 on sonic waveforms received by such tools.

FIG. 7 illustrates an example model 700 that can be used to model the effects of tool structure on the received sonic waveforms received by sonic tools, such as the LWD module 120/120A, the MWD module 130, sonic measurement device 500, etc., to enable radial profiling of shear parameters from sonic measurements as disclosed herein. The model 700 of the illustrated example includes an example sonic tool (represented as a solid cylinder in FIG. 7) concentrically placed in a second cylinder representing an example fluid-filled cased borehole. The model 700 also includes an example casing, which is represented by another cylinder, which is bonded via cement to the formation. Recorded waveforms at an array of hydrophone receivers can be processed by a modified matrix pencil algorithm based on the model 700 to isolate both nondispersive and dispersive arrivals in the wavetrain (see, for example, Ekstrom, M. E., 1995, Dispersion estimation from borehole acoustic arrays using a modified matrix pencil algorithm", Proceedings of the $29^{th}$ Asilomar Conference on Signals, Systems and Computers, IEEE Computer Society, 449-553). Both the lowest-order axi-symmetric Stoneley and flexural modes are dispersive, which means that their velocities change as a function of frequency.

Figure 8:
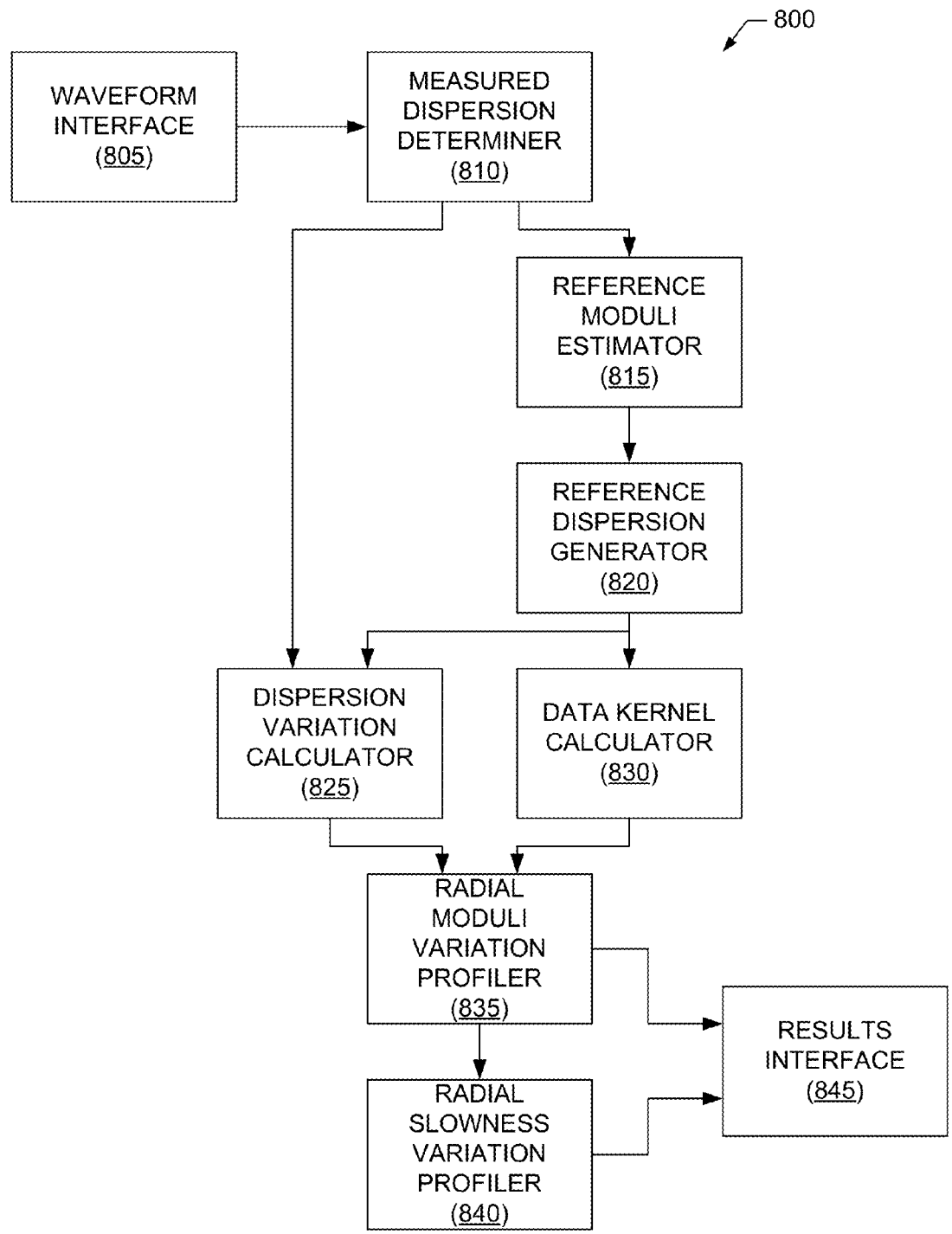
FIG. 8 is a block diagram illustrating an example radial profiling processor that may be used to perform cased-hole radial profiling of shear parameters from sonic measurements obtained from the example sonic measurement device of FIG. 6 operating in the example environments of FIGS. 1-5.

FIG. 8 illustrates an example radial profiling processor 800 that can be implemented by the logging and control unit 140 of FIG. 1 to perform cased-hole radial profiling of shear parameters from sonic measurements as disclosed herein. In some examples, some or all of the processing performed by the radial profiling processor 800 could be performed downhole (e.g., in one or more of the LWD modules 120, 120A and/or the MWD module 130). As noted above, although the radial profiling processor 800 is described in the context of processing logging-while-drilling acoustic data, the radial profiling processor 800 can be used to perform cased-hole radial profiling of shear parameters from any type of measured data, such as wireline acoustic data, borehole seismic acoustic data, surface seismic acoustic data, etc. In other words, the sonic waveform data processed by the radial profiling processor 800 can correspond to any type of measured waveform data (also referred to as waveforms) derived by sensing or otherwise detecting propagating signals.

As shown in the example of FIG. 8, the radial profiling processor 800 includes an example waveform interface 805 to receive monopole and dipole sonic measurements from, for example, the sonic measurement device 500 included in the LWD module 120/120A and/or the MWD module 130. As such, the waveform interface 805 can be implemented by any wireless or wireline connection, or combination thereof, to communicatively couple the radial profiling processor 800 with the LWD 120/120A and/or the MWD module 130.

The radial profiling processor 800 of the illustrated example also includes an example measured dispersion determiner 810 to determine measured Stoneley wave velocities for different wavenumbers (or, in other words, to determine the measured Stoneley wave dispersion) from the recorded monopole measurements. The measured dispersion determiner 810 is also to determine measured first and second flexural wave velocities for different wavenumbers (or, in other words, to determine the first and second measured flexural wave dispersions) from the recorded dipole measurements. In the illustrated example, the measured Stoneley wave dispersion is assumed to be associated with the borehole cross-sectional plane of the formation (e.g., corresponding to the $X_1$-$X_2$ plane of FIG. 4), whereas the first and second measured flexural wave dispersions are assumed to be associated with respective first (e.g., fast) and second (e.g., slow) orthogonal borehole axial planes of the formation (e.g., corresponding to the $X_1$-$X_3$ and $X_2$-$X_3$ planes, respectively, of FIG. 4). Implementation and operation of the measured dispersion determiner 810 are described in further detail below.

The example radial profiling processor 800 of FIG. 8 further includes an example reference moduli estimator 815 to estimate reference shear moduli for the formation from the dispersions measured by the measured dispersion determiner 810. For example, the reference moduli estimator 815 determines a reference value (e.g., far-field value) of a first shear modulus (e.g., $C_{66}$) from the Stoneley wave dispersion assuming the formation is effectively isotropic and radially homogenous. The reference moduli estimator 815 of the illustrated example also determines reference values (e.g., far field values) for second and third shear moduli (e.g., $C_{55}$ and $C_{44}$) from the first (e.g., fast) and second (e.g., slow) flexural dispersions assuming the formation is effectively isotropic and radially homogenous. In the illustrated example, the first shear modulus (e.g., $C_{66}$) is assumed to be associated with the borehole cross-sectional plane of the formation (e.g., corresponding to the $X_1$-$X_2$ plane of FIG. 4), whereas the second and third shear moduli (e.g., $C_{55}$ and $C_{44}$, respectively) are assumed to be associated with the respective first (e.g., fast) and second (e.g., slow) orthogonal borehole axial planes of the formation (e.g., corresponding to the $X_1$-$X_3$ and $X_2$-$X_3$ planes, respectively, of FIG. 4). Implementation and operation of the reference moduli estimator 815 are described in further detail below The radial profiling processor 800 of the illustrated example includes an example reference dispersion generator 820 to generate reference Stoneley wave velocities for different wavenumbers using any appropriate dispersion inversion technique and assuming that the formation is effectively isotropic and radially homogenous. The reference dispersion generator 820 also is to generate first (e.g., fast) and second (e.g., slow) reference flexural wave velocities for different wavenumbers using any appropriate dispersion inversion technique and assuming that the formation is effectively isotropic and radially homogenous. As for the measured dispersions, in the illustrated example, the reference Stoneley wave dispersion is assumed to be associated with the borehole cross-sectional plane of the formation (e.g., corresponding to the X1-X2 plane of FIG. 4), whereas the first and second reference flexural wave dispersions are assumed to be associated with respective first (e.g., fast) and second (e.g., slow) orthogonal borehole axial planes of the formation (e.g., corresponding to the X1-X3 and X2-X3 planes, respectively, of FIG. 4). Implementation and operation of the reference dispersion generator 820 are described in further detail below.

The example radial profiling processor 800 of FIG. 8 further includes an example dispersion variation calculator 825 to calculate the variations between the measured dispersions determined by the measured dispersion determiner 810 and the reference dispersions determined by the reference dispersion generator 820. For example, dispersion variation calculator 825 determines fractional variations of the Stoneley wave velocities for different wavenumbers, where the fractional variation of the Stoneley wave velocity for a given wavenumber is given by the ratio of: (i) a difference between the measured value and the reference value of the Stoneley wave velocity for the given wavenumber as determined by the measured dispersion determiner 810 and the reference dispersion generator 820, respectively, to (ii) the reference value of the Stoneley wave dispersion for the given wavenumber. The dispersion variation calculator 825 of the illustrated example also determines fractional variations of the first (e.g., fast) flexural wave velocities for different wavenumbers, where the fractional variation of the first (e.g., fast) flexural wave velocity for a given wavenumber is given by the ratio of: (i) a difference between the measured value and the reference value of the first (e.g., fast) flexural wave velocity for the given wavenumber as determined by the measured dispersion determiner 810 and the reference dispersion generator 820, respectively, to (ii) the reference value of the first (e.g., fast) flexural wave velocity for the given wavenumber. The example dispersion variation calculator 825 further determines fractional variations of the second (e.g., slow) flexural wave velocities for different wavenumbers, where the fractional variation of the second (e.g., slow) flexural wave velocity for a given wavenumber is given by the ratio of: (i) a difference between the measured value and the reference value of the second (e.g., slow) flexural wave velocity for the given wavenumber as determined by the measured dispersion determiner 810 and the reference dispersion generator 820, respectively, to (ii) the reference value of the second (e.g., slow) flexural wave velocity for the given wavenumber. Implementation and operation of the dispersion variation calculator 825 are described in further detail below.

The radial profiling processor 800 of the illustrated example further includes an example data kernel calculator 830 to calculate data kernels for use in determining radial profiles of shear parameters, such as shear moduli and/or shear slownesses, from the dispersion variations determined using the dispersion variation calculator 825. The example data kernel calculator 830 utilizes a perturbation model to calculate the data kernels. In some examples, the perturbation model includes parameters to model the borehole casing. In some examples, the perturbation model includes parameters to model the borehole casing but not a cement annulus between the borehole casing and the formation. In the illustrated example, the data kernels calculated by the data kernel calculator 830 include first data kernels calculated for the different wavenumbers using a Stoneley mode solution of the perturbation model, as well as respective second and third data kernels for the different wavenumbers calculated using respective first (e.g., fast) and second (e.g., slow) flexural mode solutions of the perturbation model. Implementation and operation of the data kernel calculator 830 are described in further detail below.

The example radial profiling processor 800 of FIG. 8 also includes an example radial moduli variation profiler 835 to determine radial profiles of shear moduli at different radial positions extending from the cased borehole in the formation. For example, the radial moduli variation profiler 835 determines a radial profile of the first shear modulus (e.g., $C_{66}$) at a set of radial positions from the borehole in a borehole cross-sectional plane of the formation based on the fractional variations of the first shear modulus determined at the respective set of radial positions from the borehole. In some examples, the radial moduli variation profiler 835 determines the fractional variation of the first shear modulus at a first such radial position from the borehole based on a first weighted average of fractional variations of Stoneley wave velocities for the different wavenumbers. In the illustrated example, this first weighted average uses first weights that are determined from the first data kernels calculated by the data kernel calculator 830 using the perturbation model.

In the illustrated example, the radial moduli variation profiler 835 also determines respective radial profiles of the second (e.g., $C_{55}$) and third (e.g., $C_{44}$) shear moduli at respective second and third sets of radial positions from the borehole in the respective first and second orthogonal borehole axial planes of the formation based on the respective fractional variations of the second and third shear moduli determined at the respective second and third sets of radial positions from the borehole. In some examples, the radial moduli variation profiler 835 determines the fractional variations of second and third shear moduli at respective second and third radial positions from the borehole based on second and third weighted averages of fractional variations of respective first (e.g., fast) and second (e.g., slow) flexural wave velocities for different wavenumbers. In the illustrated example, the second and third weighted averages use respective second and third weights determined from the second and third data kernels calculated by the data kernel calculator 830 using the perturbation model. Implementation and operation of the radial moduli variation profiler 835 are described in further detail below.

The radial profiling processor 800 of the illustrated example further includes an example radial slowness variation profiler 840 to determine radial profiles of shear slownesses at different radial positions extending from the cased borehole in the formation. For example, the radial slowness variation profiler 840 determines a radial profile of the shear slowness at a set of radial positions from the borehole in the borehole cross-sectional plane of the formation based on the radial profile of the first shear modulus (e.g., $C_{66}$) determined by the radial moduli variation profiler 835. In the illustrated example, the radial slowness variation profiler 840 also determines respective radial profiles of the shear slownesses at respective sets of radial positions from the borehole in the first (e.g., fast) and second (e.g., slow) orthogonal borehole axial planes of the formation based on the respective radial profiles of the second (e.g., $C_{55}$) and third (e.g., $C_{44}$) shear moduli determined by the radial moduli variation profiler 835. Implementation and operation of the radial slowness variation profiler 840 are described in further detail below.

In the illustrated example of FIG. 8, the radial profiling processor 800 includes an example results interface 845 to enable the radial profiles of shear moduli and/or shear slownesses determined by the radial moduli variation profiler 835 and the radial slowness variation profiler 840 to be output in any appropriate format. For example, the results interface 845 can be implemented by the example interface circuit 3420 and one or more of the example output devices 3424 included in the example processing system 3400 of FIG. 34, which is described in greater detail below.

Insofar as the far-field shear moduli are estimated from the processing and interpretation of the dispersive Stoneley and cross-dipole flexural waves (e.g., via the reference moduli estimator 815), it is instructive to study sensitivity of measured dispersions to the far-field formation elastic properties and modal amplitude distributions away from the borehole surface in the presence and absence of a steel casing. To this end, a mode-search routine has been developed that is based on a root-finding algorithm for a sequence of cylindrical layers with different elastic properties (e.g., see FIG. 7).

The Stoneley dispersion in a fluid-filled borehole in the presence of a casing can also be calculated (e.g., via the reference moduli estimator 815) from the solution of a classical boundary-value problem. The Stoneley dispersion for a borehole surrounded by an effectively isotropic formation can be calculated in the presence of an equivalent tool structure concentrically placed with the borehole axis to account for the tool effects on the measured sonic data (e.g., see FIG. 7). To calculate the Stoneley and dipole flexural dispersions in a cased hole surrounded by an effectively isotropic formation, which correspond to the reference dispersions described herein, the following geometrical and material parameters of the equivalent tool structure, borehole fluid, casing material, and formation are used:

1. Calibrated surface-impedance condition at the boundary between the tool and borehole fluid to simulate the tool structure effect on the Stoneley wave;
2. Calibrated parameters of a heavy-fluid column to account for the tool effect on the borehole flexural wave;
3. Borehole fluid compressional velocity and mass density;
4. Casing material mass density, compressional and shear velocities;
5. Casing inner and outer diameters; and
6. Formation mass density, compressional, and shear velocities.

Figure 9:
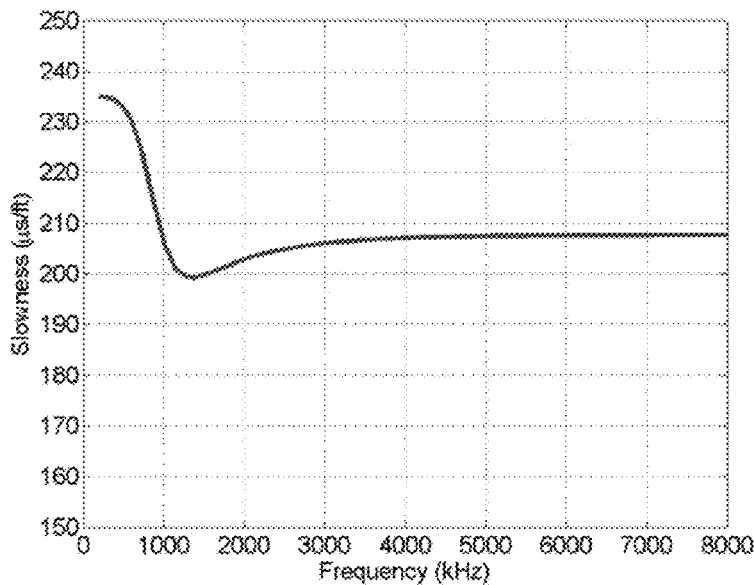
FIG. 9 depicts a graph illustrating an example Stoneley dispersion, determined using the model of FIG. 5 to account for the sonic tool structure effects on the borehole Stoneley mode, in a casing surrounded by an example fast formation having properties as listed in Table 1.
Figure 10:
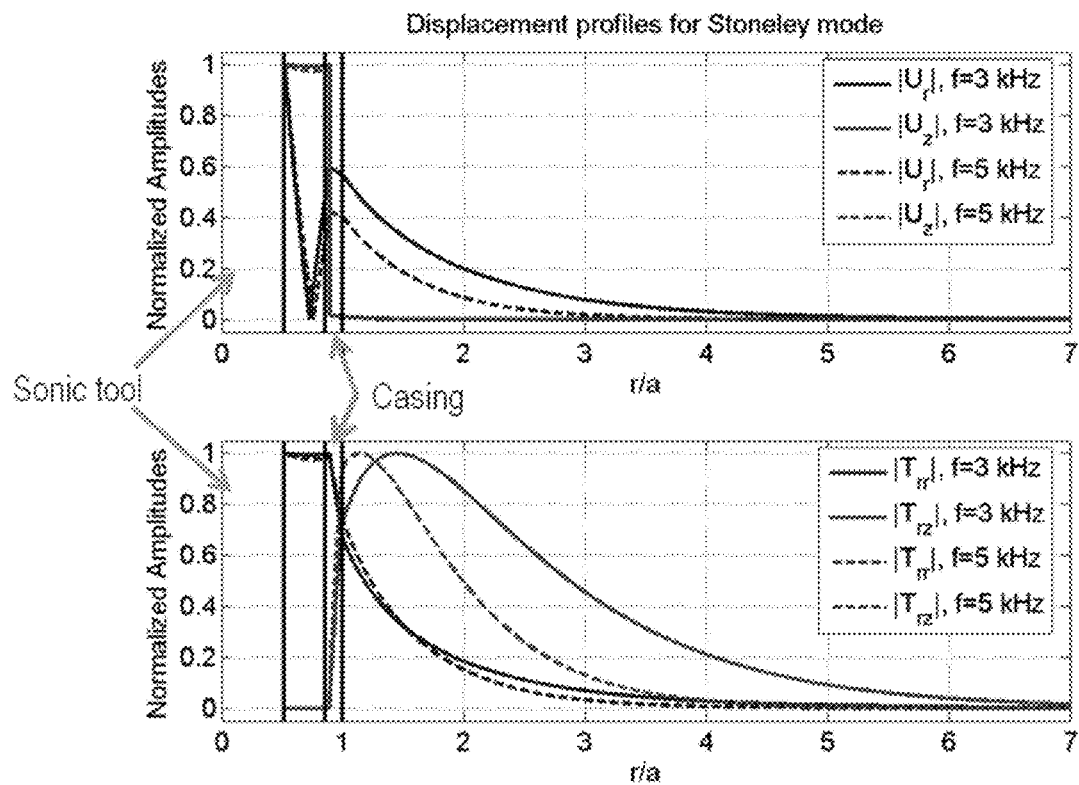
FIG. 10 depicts graphs illustrating example modal displacement and stress amplitudes for the Stoneley mode in the presence of a tool structure in a cased hole modeled using the model of FIG. 5 in a formation having properties as listed in Table 1.

Computational results are now described for a cased hole with a 7 inch casing surrounded by a fast formation having elastic properties as listed in Table 1. To develop techniques to analyze sonic data in a cased hole, radial depths of investigation as a function of frequency for both the Stoneley and flexural waves are examined. FIG. 9 depicts an example Stoneley dispersion in the 7 inch casing surrounded by a fast formation having elastic properties as listed in Table 1. The example Stoneley dispersion is determined using a resonance-impedance model based on the model 700 that accounts for the presence of a tool including a sonic measurement device, such as the LWD module 120/120A and/or the MWD module 130 including the sonic measurement device 500. The root-finding algorithm in the mode-search routine assumes that the casing is well bonded to the surrounding formation. The upper and lower subplots in FIG. 10, respectively, depict example displacement and stress amplitude distributions as a function of radial position from the borehole axis at 3 and 5 kHz. As shown in FIG. 10, higher frequency displacement and stress amplitudes exhibit shallower radial depth of investigation into the formation.

TABLE 1

| Casing Outer Diameter | Casing Inner Diameter | Fluid Velocity (Vf) | Mud Density ($\rho_m$) | Compress. Wave Velocity (Vf) | Shear Wave Velocity (Vs) | Formation Density ($\rho_f$) |
| --- | --- | --- | --- | --- | --- | --- |
| 17.78 cm | 15.8 cm | 1740 m/s | 1.040 g/cc | 4019 m/s | 1851.9 m/s | 2.743 g/cc |

Figure 11:
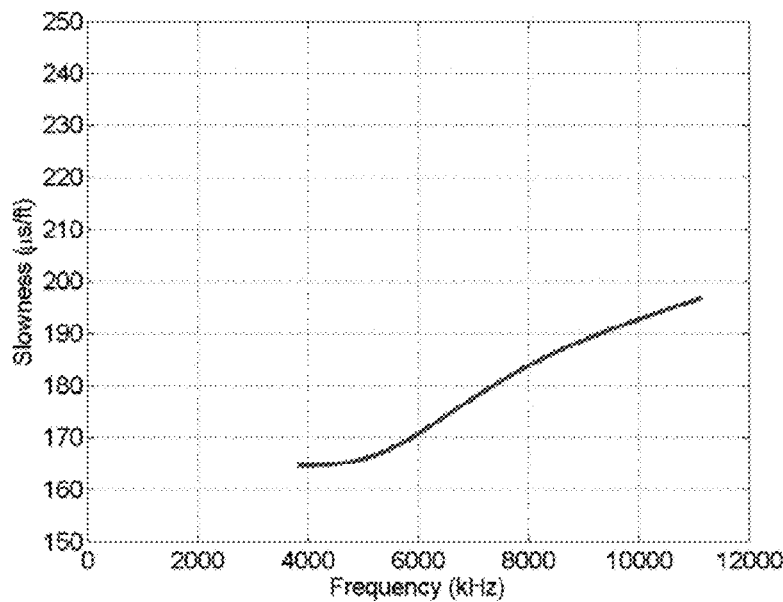
FIG. 11 depicts a graph illustrating an example lowest order flexural dispersion, determined using the model of FIG. 5 to account for the sonic tool structure effects on the borehole flexural mode, in a casing surrounded by a fast formation having properties as listed in Table 1.

FIG. 11 depicts an example lowest-order dipole flexural dispersion obtained for the cased hole surrounded by the fast formation having elastic parameters as are listed in Table 1. The example lowest-order dipole flexural dispersion is obtained using a heavy-fluid model based on the model 700 that accounts for the presence of a tool including a sonic measurement device, such as the LWD module 120/120A and/or the MWD module 130 including the sonic measurement device 500. The upper and lower subplots in FIG. 12, respectively, illustrate example displacement and stress amplitude distributions at 3 and 5 kHz, as a function of radial position from the borehole axis normalized by the casing outer radius, denoted as a. As in the case for the Stoneley waves depicted in FIG. 10, higher frequency displacement and stress amplitudes for flexural waves also exhibit shallower radial depth of investigation into the formation. Overall, in the illustrated examples, borehole flexural waves exhibit larger radial depth of investigation than those for the Stoneley waves.

The far-field dipole shear slownesses can be estimated from the low-frequency dipole dispersions, and yield shear moduli in the two orthogonal borehole axial planes. However, prior processing algorithms do not enable estimation of the far-field Stoneley shear slowness that is related to the shear modulus in the borehole cross-sectional plane.

Figure 13:
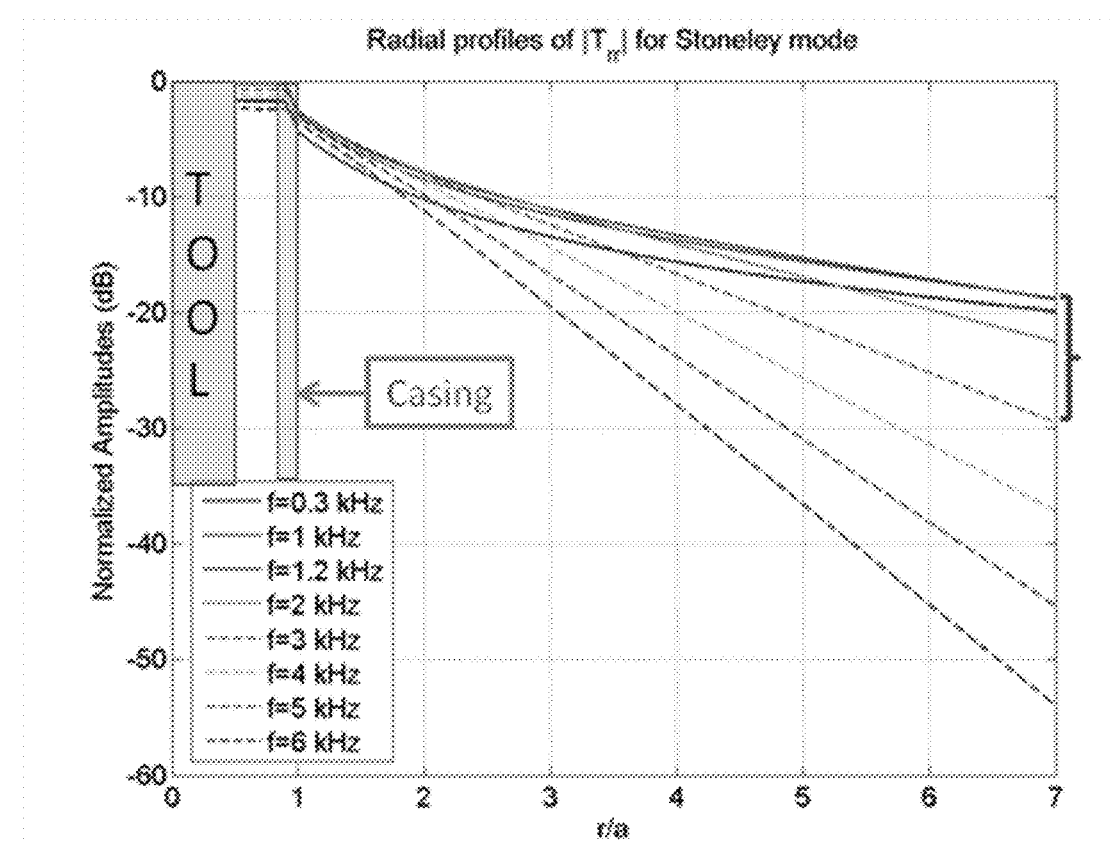
FIG. 13 depicts a graph illustrating example radial stress distributions from the Stoneley mode as a function of frequency.

Estimation of the shear modulus $C_{66}$ associated with the borehole cross-sectional plane of the formation using Stoneley dispersion in a cased hole is now described. FIGS. 9-10 illustrate that Stoneley waves at 3 and 5 kHz exhibit radial depths of investigation that extend up to about twice the casing outer diameter in the presence of a well bonded casing. FIG. 13 illustrates example radial variations of radial stress $T_{rr}$ as a function of frequency plotted on a logarithmic scale. These results help in selecting a frequency band that probes deep into the formation. The results from FIG. 11 suggest that the far-field shear modulus can be estimated by minimizing differences between the measured and model-predicted Stoneley dispersions over a frequency band of 1 to 3 kHz (e.g., because the largest radial depths are associated with the 1, 1.2, 2 and 3 kHz signals in the figure). Estimation (e.g., via the reference moduli estimator 815) of the shear modulus $C_{66}$ in the borehole cross-sectional plane using such a frequency band can yield a reliable estimate of shear modulus outside any possible near-wellbore alteration. The resulting shear modulus estimated from the Stoneley data is given by Equation 1:

$$C_{66} = \rho V_S^2 \qquad \text{Equation 1}$$

In Equation 1, $\rho$ is the formation mass density and $V_S$ is the formation shear velocity in the borehole cross-sectional plane for an effectively isotropic formation.

Figure 12:
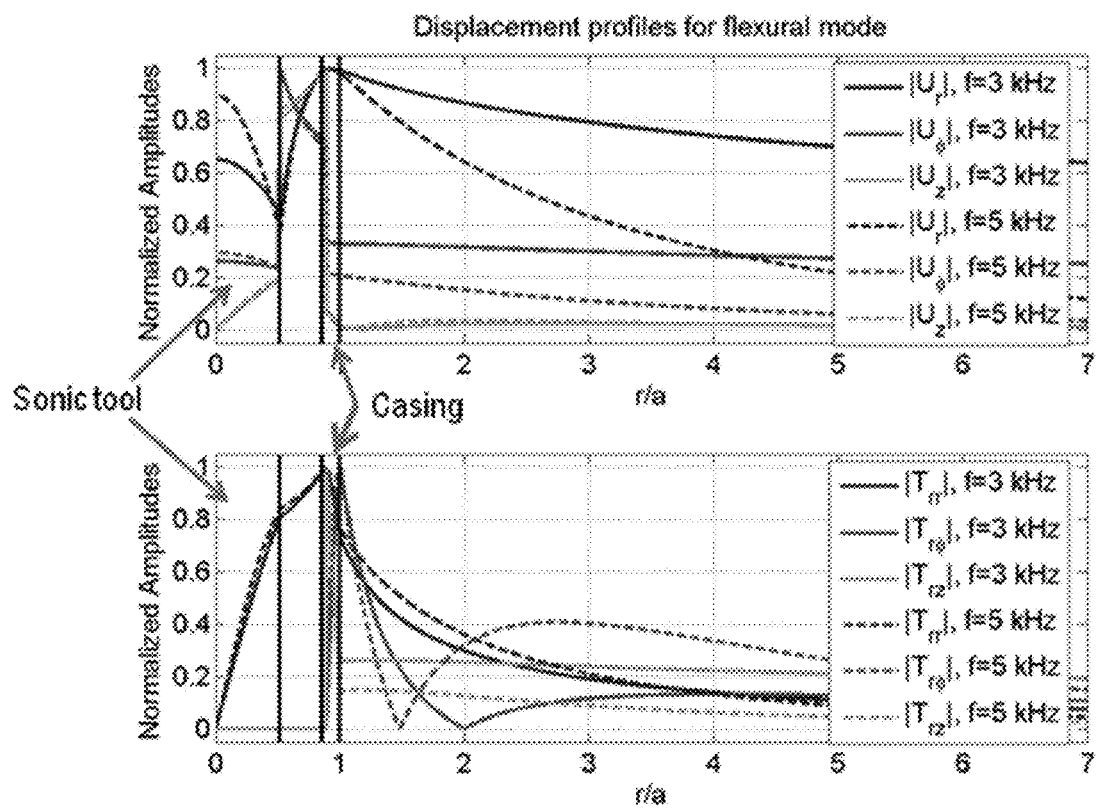
FIG. 12 depicts graphs illustrating example modal displacement and stress amplitudes for the flexural mode in the presence of a tool structure in a cased hole modeled using the model of FIG. 5 in a formation having properties as listed in Table 1.

Estimation of the shear moduli $C_{55}$ and $C_{44}$ associated, respectively, with the first (e.g., fast) and second (e.g., slow) orthogonal borehole axial planes of the formation using cross-dipole dispersion in a cased hole is now described. The two shear moduli $C_{44}$ and $C_{55}$ are obtained from the dipole data acquired in a cased hole. A dipole source placed in a fluid-filled borehole generates refracted headwaves and relatively larger amplitude borehole flexural modes. Processing of an array of recorded waveforms by a modified matrix pencil algorithm (e.g., via the reference moduli estimator 815) yields two flexural dispersions corresponding respectively to the fast and slow flexural shear waves in the orthogonal planes containing the borehole axis. Low-frequency asymptotes of borehole flexural dispersions coincide with the far-field formation shear slownesses. Radial depth of investigation of dipole flexural data as a function of frequency assists in confirming that the estimated shear moduli $C_{44}$ and $C_{55}$ are far-field parameters outside any near-wellbore alteration caused by the cement annulus. FIGS. 11-12, respectively, illustrate radial variations of displacement components and radial stress components as a function of radial distance from the borehole axis normalized by the casing outer radius, a. The fast-shear and slow-shear velocities can be converted into shear moduli as given by Equation 2 and Equation 3:

$$C_{44} = \rho V_{SS}^2 \qquad \text{Equation 2}$$

$$C_{55} = \rho V_{FS}^2 \qquad \text{Equation 3}$$

In Equation 2 and Equation 3, $\rho$ is the formation mass density, and $V_{SS}$ and $V_{FS}$ are the slow and fast flexural shear velocities in the two orthogonal borehole axial planes obtained from the processing of cross-dipole data (e.g., via the reference moduli estimator 815). Note that the low-frequency asymptotes of flexural dispersions are independent of the presence of casing and any possible sonic tool effects on dipole data and is also insensitive to mud compressional slowness (DTmud).

Based on the foregoing discussion, the three shear moduli, namely, $C_{66}$, $C_{44}$ and $C_{55}$, can be estimated using the measured Stoneley and cross-dipole dispersions obtained from sonic waveforms generated by a monopole and two orthogonal dipole transmitters placed in a fluid-filled borehole. In particular, the reference moduli estimator 815 can use the low frequency dipole waves and an intermediate frequency band of monopole Stoneley waves (e.g., in the 1-3 kHz band) to yield estimates of the far-field formation shear slownesses and the corresponding far-field moduli using Equation 1, Equation 2 and Equation 3, as described above.

Stoneley and dipole dispersions in a radially varying formation are now described. There can be various sources of radial alteration away from the steel casing. For example, in addition to the irregular cement annulus, near-wellbore stress concentrations and drilling induced damage outside the open-hole surface can introduce varying degrees of radial alteration in the formation elastic properties.

Modeling techniques can be used to study the effects of radial alteration on borehole sonic data. For example, a 3D-cylindrical finite-difference, time-domain method can generate synthetic waveforms produced by monopole, dipole, or quadrupole sources in the presence several cylindrical layers with different elastic properties (e.g., corresponding to the model 700 of FIG. 7). Synthetic waveforms can also be generated using a semi-analytical three-dimensional (3D) dyadic Green's function for elastic waves in multilayered cylindrical structures. This latter technique is, generally, faster and more accurate than the numerical finite-difference method. An efficient formulation for harmonic waves in multilayered structures that yields modal dispersion curves using root-finding technique of a boundary condition matrix has also been developed. This method can provide radial variation of displacement and stress components at various frequencies that enables estimates of radial depth of investigation as a function of signal frequency.

As an illustrative example, consider a 5.5 inch casing in a formation whose far-field elastic properties are summarized in Table 2.

TABLE 2

| Casing Outer Diameter | Casing Inner Diameter | Fluid Velocity (Vf) | Mud Density ($\rho_m$) | Compress. Wave Velocity (Vf) | Shear Wave Velocity (Vs) | Formation Density ($\rho_f$) |
|---|---|---|---|---|---|---|
| 13.97 cm | 11.86 cm | 1397 m/s | 0.6 g/cc | 3048 m/s | 1647.6 m/s | 2.12 g/cc |

Figure 14:
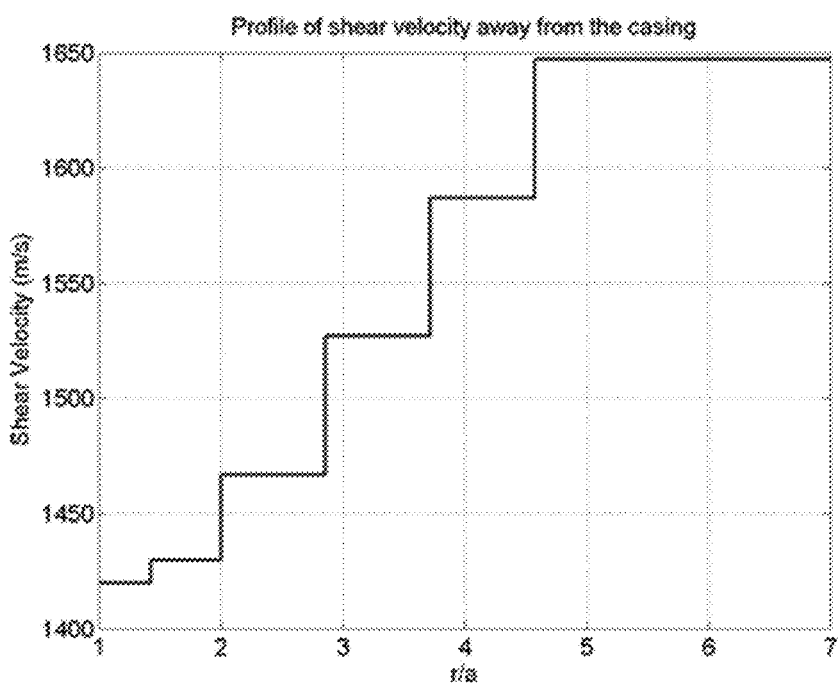
FIG. 14 depicts a graph illustrating an example staircase profile of shear wave velocity outside a casing.
Figure 15:
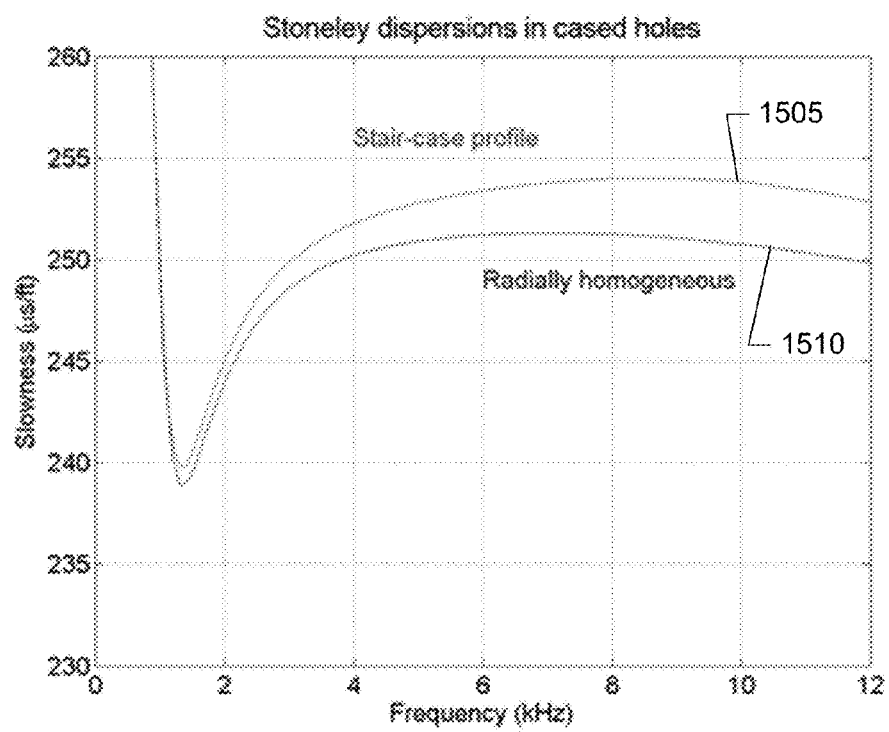
FIG. 15 depicts a graph illustrating example Stoneley dispersions in the presence of the staircase shear velocity profile shown in FIG. 13 compared with example Stoneley dispersions for a radially homogeneous formation having properties as listed in Table 2.
Figure 16:
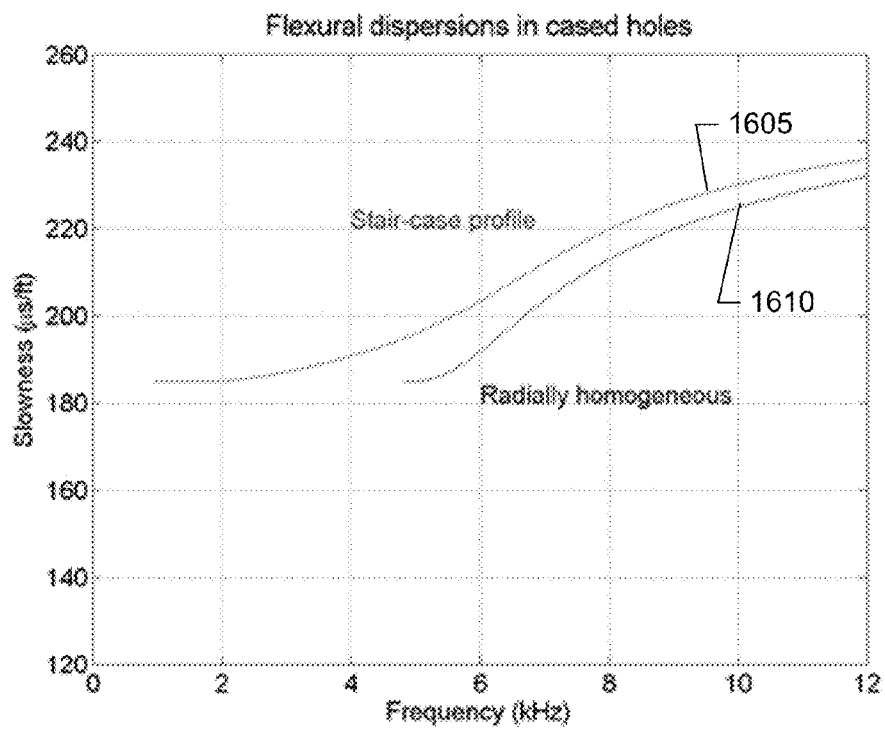
FIG. 16 depicts a graph illustrating example flexural dispersions in the presence of the staircase shear velocity profile shown in FIG. 13 compared with example flexural dispersions for a radially homogeneous formation having properties as listed in Table 2.

FIG. 14 further depicts an example stair-case profile of shear velocity away from the steel casing in the formation whose parameters are listed in Table 2 and further using a model similar to the model 700 of FIG. 7 to model the near wellbore behavior. Table 3 lists elastic properties and thicknesses of various cylindrical layers of a model similar to the model 700 used in this illustrative example. In Table 3, R1 and R2, respectively, denote the inner and outer radii of cylindrical layers, whereas $\rho$, Vp, and Vs, respectively, are the mass density, compressional and shear velocities of the corresponding layers. The resulting Stoneley and flexural dispersions (labeled 1505 and 1605, respectively) calculated using a multilayer mode-search routine for the stair-case profile of shear velocity of FIG. 14 and the parameters of Tables 2 and 3 are presented in FIGS. 15 and 16, respectively. FIGS. 15 and 16 also depict the corresponding Stoneley and flexural dispersions (labeled 1510 and 1610, respectively) for the radially homogeneous formation. As shown in FIG. 15 there is a relatively small amount of difference in the Stoneley dispersion at higher frequencies caused by a given amount near-wellbore alteration in terms of fractional change in the shear velocity. In contrast, as shown in FIG. 16, there is a change in the flexural dispersion at low frequencies in the presence of near-wellbore alteration outside the casing. Notice that there is a considerable shift in the "kick-in" frequency to lower frequencies where the flexural dispersion starts to depart from the zero slope.

TABLE 3

| R1 (cm) | R2 (cm) | Vp (m/s) | Vs (m/s) | P (g/cc) |
|---|---|---|---|---|
| 0.0 | 4.6 | 930 | 0.0 | 4.4517 |
| 4.6 | 5.93 | 1397 | 0.0 | 0.60 |
| 5.93 | 6.985 | 5800 | 3100 | 7.90 |
| 6.985 | 9.985 | 3048 | 1420 | 2.04 |
| 9.985 | 13.985 | 3048 | 1430 | 2.06 |
| 13.985 | 19.985 | 3048 | 1467 | 2.08 |
| 19.985 | 25.985 | 3048 | 1527 | 2.10 |
| 25.985 | 31.985 | 3048 | 1587 | 2.11 |
| 31.985 | ∞ | 3048 | 1647.57 | 2.12 |

A perturbation model for determining the Stoneley and dipole dispersions in a radially varying formation is now described. In some examples, when the propagating medium outside the casing is radially heterogeneous, a perturbation model can be used by the radial profiling processor 800 to calculate changes in the Stoneley and flexural dispersions for different radial variations in the shear modulus away from the casing outer surface. An example of such a perturbation model represents fractional changes in the phase velocity of a borehole mode (e.g., the Stoneley mode, the fast flexural mode, or the slow flexural mode) at a given axial wavenumber $k_i$ in terms of the following volume integrals given by Equation 4 through Equation 7:

$$\frac{\Delta V_i}{V_i} = \frac{\mu I_N(k_i)}{\omega^2 I_D(k_i)}, \quad \text{Equation 4}$$

where, $$\frac{\Delta V_i}{V_i} = \frac{V_i^{measured} - V_i^{reference}}{V_i^{reference}}, \quad \text{Equation 5}$$

$$I_N(k_i) = \quad \text{Equation 6}$$
$$\int_a^\infty r\,dr \int_0^{2\pi} d\theta [(e_{r\theta}e_{r\theta} + e_{\theta z}e_{\theta z} + e_{zr}e_{zr})/2 + (e_{zz} - e_{rr})$$
$$(e_{zz} - e_{rr})/3 + (e_{rr} - e_{\theta\theta})(e_{rr} - e_{\theta\theta})/3 +$$
$$(e_{\theta\theta} - e_{zz})(e_{\theta\theta} - e_{zz})/3]\left(\frac{\Delta\mu(r)}{\mu}\right),$$

and, $$I_D(k_i) = \rho_{hf}\int_0^c r\,dr\int_0^{2\pi} d\theta(u_r^{hf}u_r^{hf} + u_z^{hf}u_z^{hf}) + \rho_f\int_c^b r\,dr\int_0^{2\pi} d\theta$$
$$(u_r^f u_r^f + u_z^f u_z^f) + \rho_s\int_b^a r\,dr\int_0^{2\pi} d\theta(u_r^c u_r^c + u_\theta^c u_\theta^c +$$
$$u_z^c u_z^c) + \rho\int_a^\infty r\,dr\int_0^{2\pi} d\theta(u_r u_r + u_\theta u_\theta + u_z u_z), \quad \text{Equation 7}$$

In Equation 4 through Equation 7, $V_i$ represents the wave velocity (e.g., Stoneley, fast flexural, slow flexural, etc.) at frequency $f_i$, the superscript "measured" refer to the measured velocity (e.g., as determined by the measured dispersion determiner 810), whereas "reference" refers to the reference velocity calculated assuming an effectively isotropic and homogeneous formation (e.g., as determined by the reference dispersion generator 820). The quantity c denotes the radius of the heavy-fluid column used to account for the tool effects on dipole flexural dispersions (e.g., such as effects of a wireline sonic tool, the LWD module 120/120A and/or the MWD module 130 including the sonic measurement device 500). The quantities b and a, respectively, represent the inner and outer radii of the steel casing bonded to the cement annulus. The quantities $u_r$, $u_\theta$, and $u_z$ are the displacement components for a given axial wavenumber associated with the modal solution in the homogeneous formation (r>a) outside the casing. The axial wavenumber $k_i$, is given by $$k_i = \frac{2\pi f_i}{V_i} \quad \text{Equation 8}$$

The quantities $u_r^c$, $u_\theta^c$, and $u_z^c$ are the displacement components in the cylindrical casing. The quantities $u_r^f$ and $u_z^f$ are the displacement components in the borehole liquid. The quantities $u_r^{hf}$ and $u_z^{hf}$ are the displacement components in the heavy-fluid column introduced to account for the tool effects on the borehole flexural mode. The resonance impedance model for the tool effects on the Stoneley mode is used in terms of a surface impedance condition at the interface between the tool and borehole fluid (r=c). The quantities $e_{rr}$, $e_{\theta\theta}$, $e_{zz}$, $e_{zr}$, $e_{r\theta}$, and $e_{\theta z}$ are the six dynamic strains in the formation. In some examples, these dynamic strains associated with the modal propagation in the radially homogeneous formation are calculated from the displacement solution obtained from the mode-search routine. The far-field shear modulus $\mu$ (e.g., corresponding to $C_{44}$, $C_{55}$ or $C_{66}$ depending on which shear modulus is being radially profiled) is used to calculate the eigenfunction associated with a borehole mode for a radially homogeneous formation.

Inversion of the borehole dispersions for radial variations in shear modulus is now described. With reference to FIG. 4, consider a borehole parallel to the $X_3$-axis and its cross-sectional plane parallel to the $X_1$-$X_2$-plane. Processing of dipole data acquired by a transmitter aligned with the $X_1$-axis yields the shear modulus $C_{55}$, whereas the other orthogonal transmitter aligned with the $X_2$-axis yields the shear modulus $C_{44}$. The Stoneley data is used to obtain the shear modulus $C_{66}$ in the borehole cross-sectional plane. Referred to an isotropically loaded reference state, formation shear moduli in the three orthogonal planes are the same ($C_{44}=C_{55}=C_{66}=\mu$). When this rock is subject to anisotropic incremental stresses, changes in, for example, the dipole shear modulus $C_{55}$ can be expressed by Equation 9:

$$\gamma_i = \frac{\Delta V_i}{V_i} = \int_a^\infty G_i(r) \frac{\Delta C_{55}(r)}{C_{55}} r\, dr, \quad \text{Equation 9}$$

where the data kernel $G_i(r)$ is obtained as a function of axial wavenumber $k_i$ in terms of the eigensolution associated with a borehole mode for a radially homogeneous formation in the chosen reference state. The data kernels $G_i(r)$ are determined (e.g., by the data kernel calculator 830) from perturbation integrals shown in Equation 4 through Equation 7 (e.g., by setting Equation 9 equal to the perturbation model of Equation 4, setting $\Delta\mu(r)/\mu = \Delta C_{55}/C_{55}$, and solving for $G_i(r)$).

As an illustrative example, consider estimating the radial variation in the shear modulus $C_{55}$ expressed as $\Delta C_{55}(r)/C_{55}$ in terms of fractional changes in the phase velocity of a borehole mode, $\Delta V_i/V_i$, from a radially homogeneous reference state at a finite number of frequencies (or, equivalently, axial wavenumbers $k_i$). By summing the integral equation of Equation 9 over the finite number of frequencies (or, equivalently, axial wavenumbers $k_i$), Equation 9 becomes a weighted average given by Equation 10:

$$\int_a^\infty A(r) \frac{\Delta C_{55}(r)}{C_{55}} r\, dr, \quad \text{Equation 10}$$

where $$\int_a^\infty A(r) r\, dr = 1, \quad \text{Equation 11}$$

and $A(r)$ is a linear combination given by Equation 12:

$$A(r) = \sum_{i=1}^N a_i G_i(r), \quad \text{Equation 12}$$

or, in other words, $A(r)$ is a linear combination, or weighted average, of the data kernels $G_i(r)$ over the axial wavenumbers but weighted based on the weights $a_i$.

A suitable choice of the coefficients $a_i$ (for i=1, 2, ... N), can concentrate $A(r)$ near any desired radial position $r_o$ in Equation 10, such as by causing $A(r)$ to be a function that behaves similar to $\delta(r-r_o)$, which is the impulse function centered at the radial position $r_o$. To determine such an example set of coefficients $a_i$ (for i=1, 2, ... N), consider that Equation 11 can be expressed as Equation 13:

$$\sum_{i=1}^N a_i u_i = 1, \quad \text{Equation 13}$$

where $$u_i = \int_a^\infty G_i(r) r\, dr. \quad \text{Equation 14}$$

At a particular radial position $r_o$, the spread of $A(r)$ about $r_o$ is given by Equation 15:

$$S(r_o, A) = \int_a^\infty (r-r_0)^2 A^2(r) r\, dr, \quad \text{Equation 15}$$

or, equivalently, by Equation 16:

$$S(r_0, A) = \sum_{i,j} S_{ij}(r_0) a_i a_j, \quad \text{Equation 16}$$

where $$S_{ij}(r_0, A) = \int_a^\infty (r-r_0)^2 G_i(r) G_j(r) r\, dr. \quad \text{Equation 17}$$

In some examples, the coefficients $a_i$ (for i=1, 2, ... N) are determined so as to minimize the function given by Equation 18:

$$\Sigma S_{ij}(r_0) a_i a_j, \quad \text{Equation 18}$$

subject to the condition of Equation 19:

$$\Sigma u_i a_i = 1. \quad \text{Equation 19}$$

Solution of the foregoing minimization problem yields a weighted average for $\Delta C_{55}(r_o)/C_{55}$ given by Equation 20:

$$\frac{\Delta C_{55}(r_o)}{C_{55}} = \frac{u_j S_{ij}^{-1}(r_o) \gamma_i}{u_j S_{ij}^{-1}(r_o) u_i} = a_i(r_0)\gamma_i, \quad \text{Equation 20}$$

where, from Equation 9, $\gamma_i = \Delta V_i/V_i$ denotes fractional changes/variation in the fast flexural phase velocity at select wavenumbers $k_i$. In other words, to determine the fractional variation of the fast flexural shear modulus ($\Delta C_{55}(r_o)/C_{55}$) at a first radial position ($r_0$), the fractional variation in the fast flexural wave dispersion ($\gamma_i = \Delta V_i/V_i$) is calculated at the wavenumbers $k_i$ (e.g., by the dispersion variation calculator 825). Then, using Equation 17 and Equation 20, the coefficients $a_i$ (for i=1, 2, N) are calculated (e.g., by the radial moduli variation profiler 835) for the first radial position ($r_0$) by Equation 21:

$$a_i(r_0) = \sum_j \frac{u_j S_{ij}^{-1}(r_0)}{u_j S_{ij}^{-1}(r_0) u_i}, \quad \text{Equation 21}$$

where the function $S_{ij}^{-1}(r_0)$ is based on the data kernels $G_i(r)$ as shown in Equation 17. Then, using Equation 20, the fractional variation of the fast flexural shear modulus ($\Delta C_{55}(r_o)/C_{55}$) at a first radial position ($r_0$) from the borehole can be computed (e.g., by the radial moduli variation profiler 835) as the weighted average of the fractional variation in the fast flexural wave velocity ($\gamma_i = \Delta V_i/V_i$), which is given by Equation 22:

$$\frac{\Delta C_{55}(r_0)}{C_{55}(r_0)} = \sum_i a_i \frac{\Delta V_i}{V_i}.$$ Equation 22

The preceding computation of the fast flexural shear modulus ($\Delta C_{55}(r_o)/C_{55}$) is then repeated at different radial positions ($r_0$) of interest to yield a radial profile of the fast flexural shear modulus $C_{55}(r_o)$.

The preceding equations, after appropriate modification, can also be used to calculate the radial profile of the slow flexural shear modulus $C_{44}(r_o)$ and/or the Stoneley shear modulus $C_{66}(r_o)$. For example, to determine the fractional variation of the slow flexural shear modulus ($\Delta C_{44}(r_o)/C_{44}$) at a first radial position ($r_0$), the fractional variation in the slow flexural wave velocity ($\gamma_i=\Delta V_i/V_i$) is calculated at the wavenumbers $k_i$ (e.g., by the dispersion variation calculator 825). The data kernels $G_i(r)$ are determined (e.g., by the data kernel calculator 830) from perturbation integrals shown in Equation 4 through Equation 7 (e.g., by setting Equation 9 equal to the perturbation model of Equation 4, setting $\Delta\mu(r)/\mu=\Delta C_{44}/C_{44}$, and solving for $G_i(r)$). Then, using Equation 17 and Equation 20, the coefficients $a_i$ (for i=1, 2, . . . N) are calculated (e.g., by the radial moduli variation profiler 835) for the first radial position ($r_0$) by Equation 21. Then, using Equation 20, the fractional variation of the slow flexural shear modulus ($\Delta C_{44}(r_o)/C_{44}$) at a first radial position ($r_0$) from the borehole can be computed (e.g., by the radial moduli variation profiler 835) as the weighted average of the fractional variation in the slow flexural wave velocity ($\gamma_i=\Delta V_i/V_i$), which is given by Equation 23:

$$\frac{\Delta C_{44}(r_0)}{C_{44}(r_0)} = \sum_i a_i \frac{\Delta V_i}{V_i}$$ Equation 23

The preceding computation of the slow flexural shear modulus ($\Delta C_{44}(r_o)/C_{44}$) is then repeated at different radial positions ($r_0$) of interest to yield a radial profile of the slow flexural shear modulus $C_{44}(r_o)$.

Similarly, to determine the fractional variation of the Stoneley shear modulus ($\Delta C_{66}(r_o)/C_{66}$) at a first radial position ($r_0$), the fractional variation in the Stoneley wave velocity ($\gamma_i=\Delta V_i/V_i$) is calculated at the wavenumbers $k_i$ (e.g., by the dispersion variation calculator 825). The data kernels $G_i(r)$ are determined (e.g., by the data kernel calculator 830) from perturbation integrals shown in Equation 4 through Equation 7 (e.g., by setting Equation 9 equal to the perturbation model of Equation 4, setting $\Delta\mu(r)/\mu=\Delta C_{66}/C_{66}$, and solving for $G_i(r)$). Then, using Equation 17 and Equation 20, the coefficients $a_i$ (for i=1, 2, . . . N) are calculated (e.g., by the radial moduli variation profiler 835) for the first radial position ($r_0$) by Equation 21. Then, using Equation 20, the fractional variation of the Stoneley shear modulus ($\Delta C_{66}(r_o)/C_{66}$) at a first radial position ($r_0$) from the borehole can be computed (e.g., by the radial moduli variation profiler 835) by the weighted average of the fractional variation in the Stoneley wave velocity ($\gamma_i=\Delta V_i/V_i$) as given by Equation 24:

$$\frac{\Delta C_{66}(r_0)}{C_{66}(r_0)} = \sum_i a_i \frac{\Delta V_i}{V_i}$$ Equation 24

The preceding computation of the Stoneley shear modulus ($\Delta C_{66}(r_o)/C_{66}$) is then repeated at different radial positions ($r_0$) of interest to yield a radial profile of the Stoneley shear modulus $C_{66}(r_o)$.

In some examples, the input dispersion variations ($\gamma_i$) are subject to errors, which may be unknown. In such examples, the fractional changes in the shear modulus (e.g., $C_{55}$ in the example below, but which could be any of the shear moduli being determined) can be represented by Equation 25:

$$\frac{\Delta C_{55}(r_o)}{C_{55}} = \frac{u_j W_{ij}^{-1}(\alpha, r_o)\gamma_i}{u_j W_{ij}^{-1}(\alpha, r_o)u_i} = a_i(\alpha, r_o)\gamma_i,$$ Equation 25 where $$W_{ij}(\alpha, r_o) = E_{ij} + \alpha S_{ij}(r_o),$$ Equation 26 and $E_{ij}$ is the covariance matrix of the error $\Delta\gamma_i$. Because the estimated fractional change in the shear modulus $\Delta C_{55}(r_o)/C_{55}$ is a linear function of the input data $\gamma_i$, the error e in the estimate of $\Delta C_{55}(r_o)/C_{55}$ can be defined in terms of Equation 27:

$$e^2 = a_j(\alpha, r_o) E_{ij} a_i(\alpha, r_o),$$ Equation 27 and the spread, or radial averaging distance, can be expressed as by Equation 28:

$$s(\alpha, r_o) = a_j(\alpha, r_o) S_{ij}(r_o) a_i(\alpha, r_o),$$ Equation 28 where the trade-off parameter $\alpha$ can be chosen to optimize between an acceptable error in the estimate and the radial resolution desired for a particular problem at hand. As the trade-off parameter $\alpha$ increases from 0 to infinity, the radial spread s decreases from $s_{max}$ to $s_{min}$, and the error e increases from $e_{min}$ to $e_{max}$. The trade-off parameter $\alpha$ can be written as Equation 29:

$$\frac{1}{\alpha} = \Omega\tan\theta,$$ Equation 29 such that $\alpha$ can range from 0 to infinity, parameterized by the parameter $\theta$ with a finite range $0<\theta<90°$. The constant $\Omega$ may be chosen to adjust increments in $\theta$ for different distances along the curve. In some examples, the radial spread s is designed to be a little larger than $s_{min}$, which can produce a considerable reduction in the error e.

Figure 17:
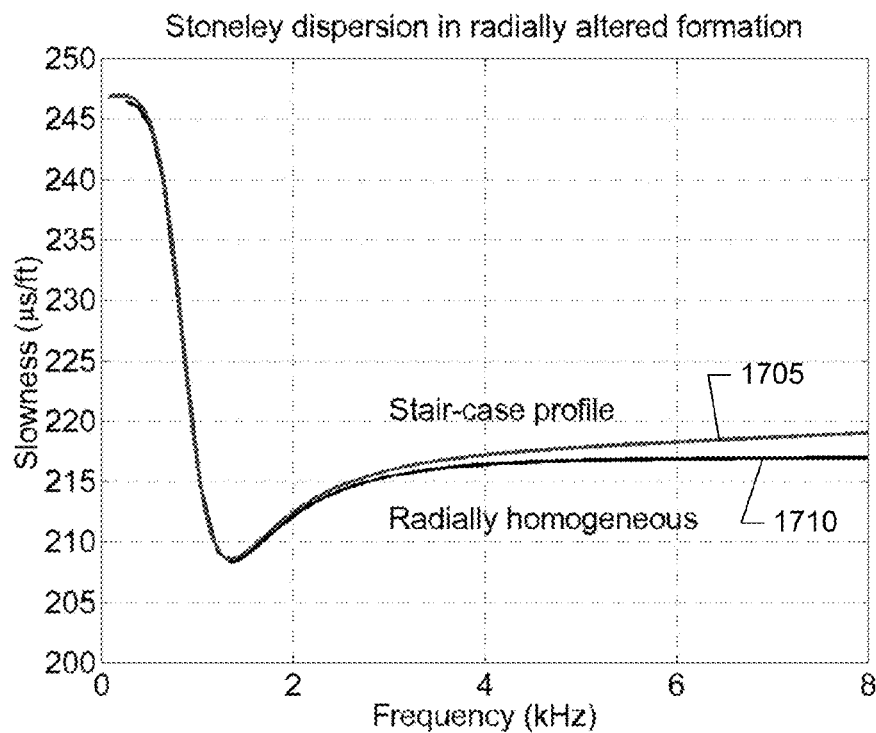
FIG. 17 depicts a graph illustrating example Stoneley dispersions in the presence of the staircase shear velocity profile as listed in Table 4 compared with example Stoneley dispersions for a radially homogeneous formation having properties as listed in Table 2.
Figure 18:
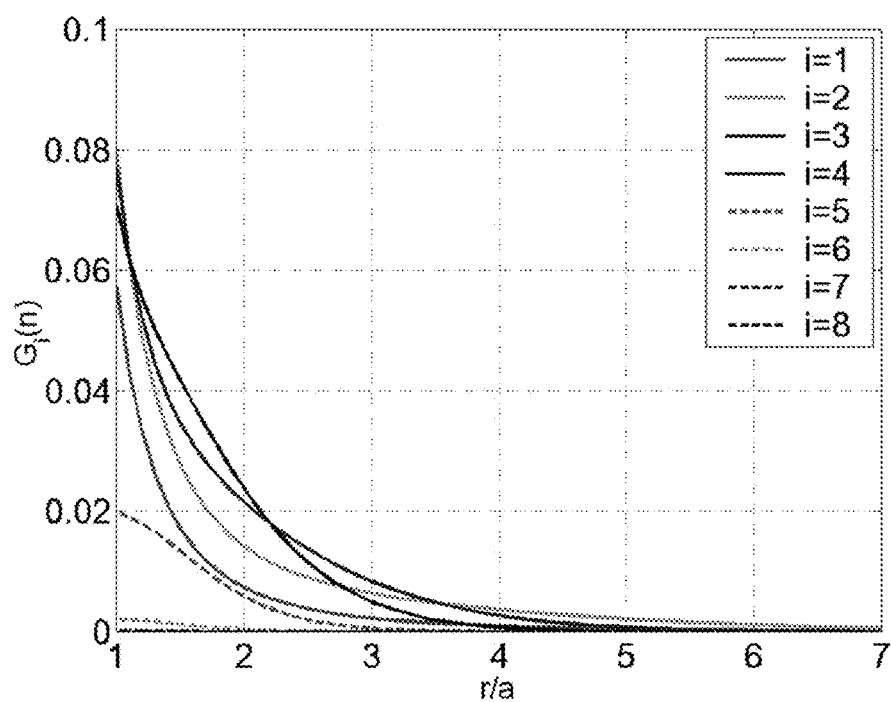
FIG. 18 depicts a graph illustrating example data kernels for different wavenumbers that can be used to perform radial profiling of Stoneley shear parameters from sonic measurements as disclosed herein.

Example radial profiling results obtained by the radial profiling processor 800 for synthetic sonic waveforms corresponding to the presence of a casing are now described. Consider a radially varying formation outside a 7-inch casing and having elastic properties as summarized in Table 4. The inner and outer radii of each cylindrical layer (similar to the model 700 of FIG. 7) are denoted by R1 and R2, respectively, in Table 4. This synthetic example assumes radial alteration in shear velocity of up to about 14% from that in the far-field, which translates into a near-wellbore shear modulus alteration of about 28% from that in the far-field. FIG. 17 illustrates a comparison of the Stoneley dispersion 1705 for the example stair-case profile of Table 4 relative to the dispersion 1710 for a radially homogeneous formation. In the illustrated example, the presence of a steel casing reduces sensitivity of Stoneley dispersion to changes in the formation shear modulus compared to what is observed in an open hole. FIG. 18 depicts an example of the radial variation of the data kernels $G_i(n)$ for different signal frequencies denoted by i=1, 2, 3, . . . 8 for this synthetic example. The data kernel $G_i$ in the integral Equation 9 is a measure of the sensitivity of fractional changes in the Stoneley phase velocity for a given fractional change in the shear modulus.

TABLE 4

| R1 (cm) | R2 (cm) | Vp (m/s) | Vs (m/s) | P (g/cc) |
|---|---|---|---|---|
| 0.0 | 4.6 | 930 | 0.0 | 4.4517 |
| 4.6 | 7.97 | 1700 | 0.0 | 1.2 |
| 7.97 | 8.89 | 5800 | 3100 | 7.9 |
| 8.89 | 9.985 | 4000 | 1720 | 2.3 |
| 9.985 | 13.985 | 4000 | 1760 | 2.3 |
| 13.985 | 19.985 | 4000 | 1820 | 2.3 |
| 19.985 | 25.985 | 4000 | 1880 | 2.3 |
| 25.985 | 31.985 | 4000 | 1940 | 2.3 |
| 31.985 | ∞ | 4000 | 2000 | 2.3 |

Figure 19:
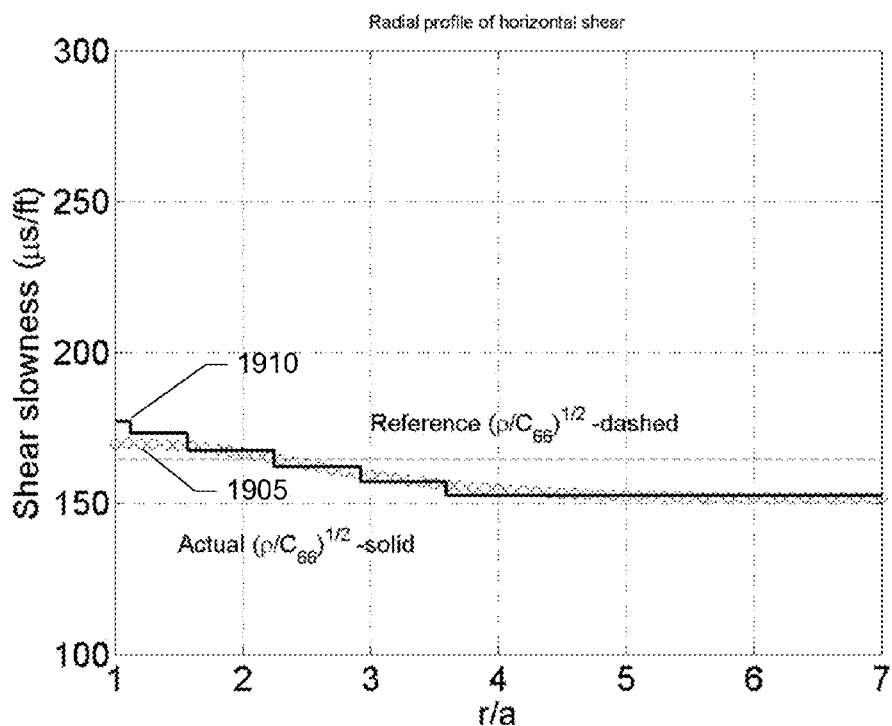
FIG. 19 depicts a graph illustrating an example estimated radial profile of Stoneley shear slowness obtained from an example synthetic Stoneley dispersion corresponding to an example illustrated staircase profile of formation shear slowness outside a steel casing.

FIG. 19 illustrates an example inverted radial profile of the Stoneley shear slowness (corresponding to the circles 1905) obtained from the example synthetically generated Stoneley dispersion for a radially altered formation outside the casing, based on the example of Table 4. The radially altered formation is described by a stair-case profile of the shear slowness (corresponding to the line 1910 depicted in FIG. 19). As illustrated in the example of FIG. 19, good agreement has been obtained between the inverted and stair-case shear slowness profile used to generate the input Stoneley dispersion.

Figure 20:
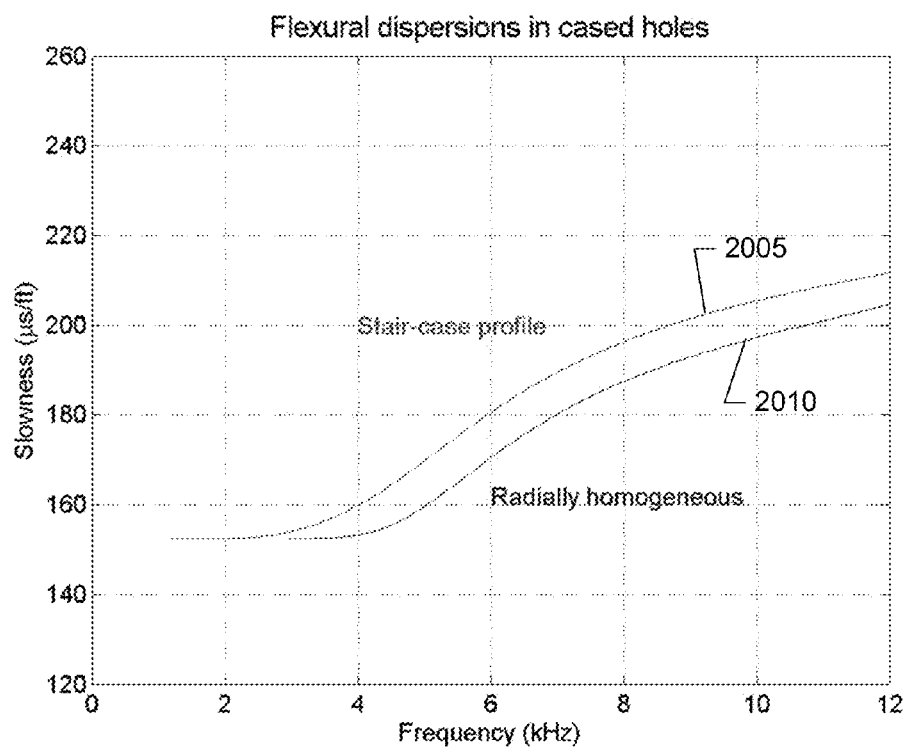
FIG. 20 depicts a graph illustrating example flexural dispersions in the presence of the staircase shear velocity profile as listed in Table 4 compared with example flexural dispersions for a radially homogeneous formation having properties as listed in Table 2.
Figure 21:
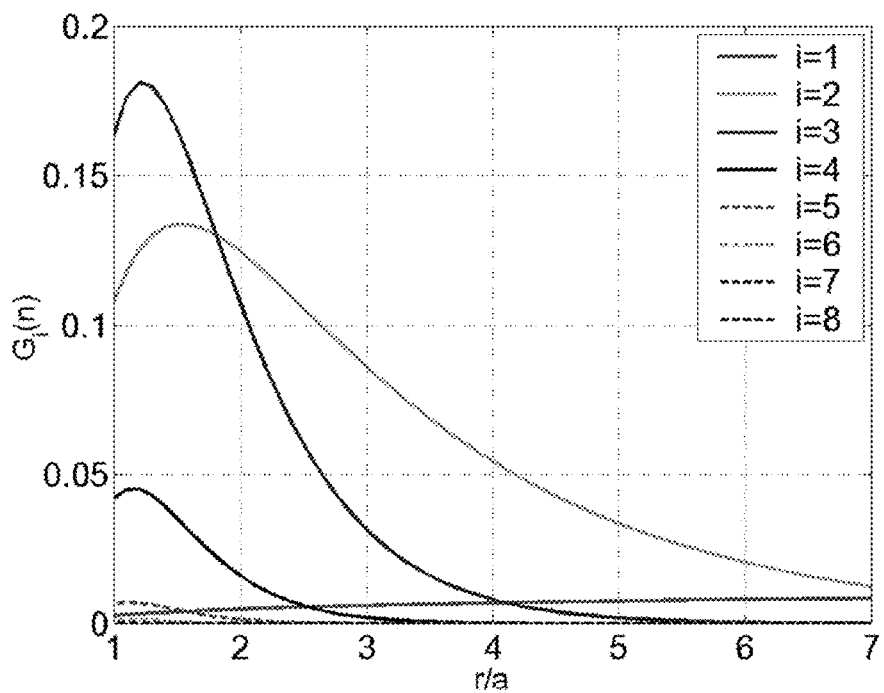
FIG. 21 depicts a graph illustrating example data kernels for different wavenumbers that can be used to perform radial profiling of dipole shear parameters from sonic measurements as disclosed herein.
Figure 22:
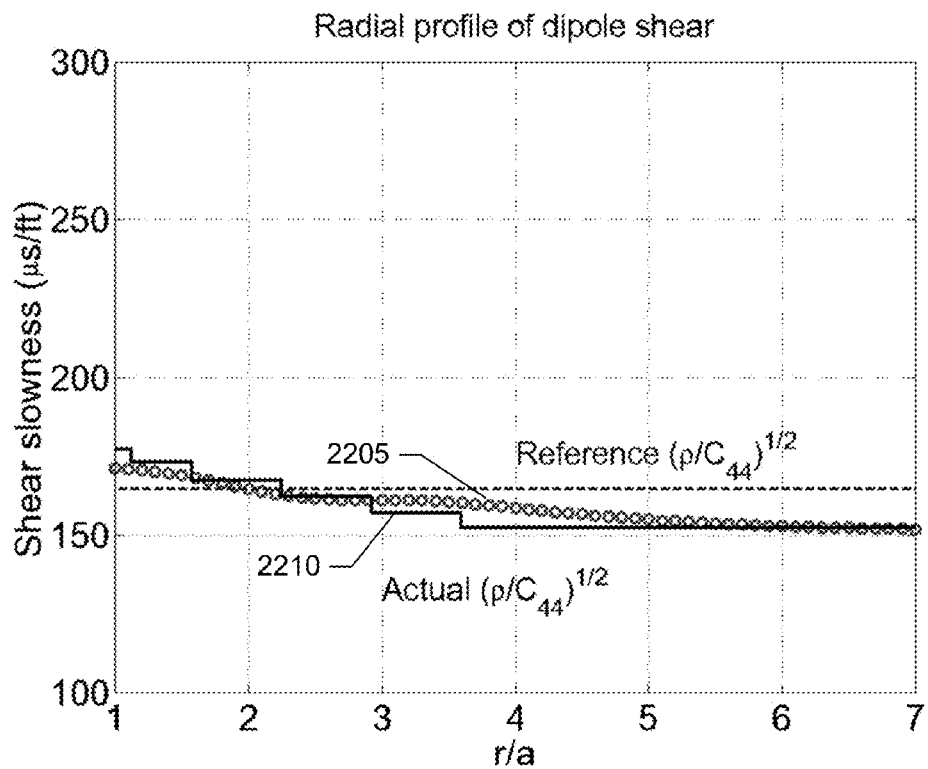
FIG. 22 depicts a graph illustrating an example estimated radial profile of flexural shear slowness obtained from an example synthetic flexural dispersion corresponding to an example illustrated staircase profile of formation shear slowness outside a steel casing.

Next, example results for the inverted radial profile of the dipole shear slowness are described. FIG. 20 provides a comparison of dipole flexural dispersions 2005 obtained for the example stair-case profile of shear velocity as shown in Table 4 relative to the dispersion 2010 obtained for a radially homogeneous formation. Notice that changes in the dipole flexural dispersion are more pronounced than that for the Stoneley dispersion shown in FIG. 18 for the same amount of radial alteration in the formation surrounding the steel casing. FIG. 21 depicts radial variations in the data kernel $G_i(n)$ for different frequencies that describes sensitivity of flexural dispersion to a fractional change in the formation shear modulus. These results again confirm that flexural dispersions are more sensitive to changes in the formation shear modulus outside the steel casing than those for Stoneley dispersions. FIG. 22 provides a comparison of the inverted radial profile of dipole shear slowness (corresponding to the circles 2205) obtained from the synthetic dipole dispersion in the presence of a stair-case profile of shear velocity in the formation outside the steel casing (corresponding to the line 2210 depicted in FIG. 22), based on the example of Table 4. Again, as illustrated in the example of FIG. 22, good agreement is obtained between the inverted and input stair-case profile of formation shear slowness outside the casing.

The foregoing results validate the feasibility of the disclosed example cased-hole radial profiling techniques for obtaining radial profiles of shear slowness from measured Stoneley and flexural dispersions.

Application of the disclosed example cased-hole radial profiling techniques to monitoring changes in reservoir stresses caused by depletion or injection of fluid is now described. When a reservoir is produced or is subject to fluid injection as part of enhanced oil recovery program, pore pressure can either increase or decrease from the initial reservoir pressure before production. Such changes in the reservoir pressure can cause associated changes in the reservoir stresses. Estimating the depletion-induced or injection-induced changes in reservoir stresses can enable the reservoir pressure to be maintained within a safe window for geomechanical stability of the producing reservoir.

Borehole sonic data acquired before and after depletion or injection can be used to estimate changes in the reservoir stresses. In accordance with the example cased-hole radial profiling techniques disclosed herein, sonic data acquired in a producing or observation cased-well can be inverted for the far-field compressional and the three shear moduli. Changes in these elastic moduli can then be inverted for corresponding changes in formation stresses as a function of pore pressure. The near-wellbore region of a producing cased borehole can be rather complex depending on the completion design and, thus, may exhibit varying degrees of near-wellbore alteration. Complexity can arise from the presence of a sand-screen, a gravel pack, a perforated steel casing, etc. However, the disclosed example cased-hole radial profiling techniques can account for such complexity and invert measured Stoneley and dipole dispersions to estimate/obtaining radial profiles of formation shear slownesses (or equivalently, shear moduli) as a function of radial position away from the casing surface.

Figure 23:
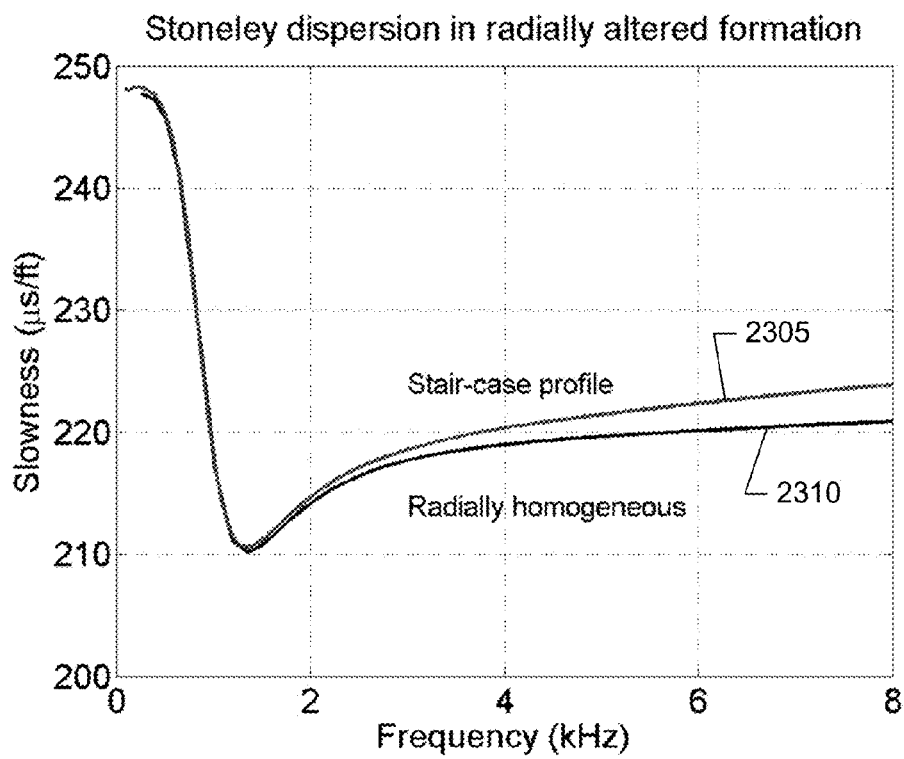
FIG. 23 depicts a graph illustrating an example Stoneley dispersion in a cased hole surrounded by a depleted reservoir that exhibits a reduction in the far-field shear modulus in the presence of near-wellbore alteration caused by a reduction in pore pressure.
Figure 24:
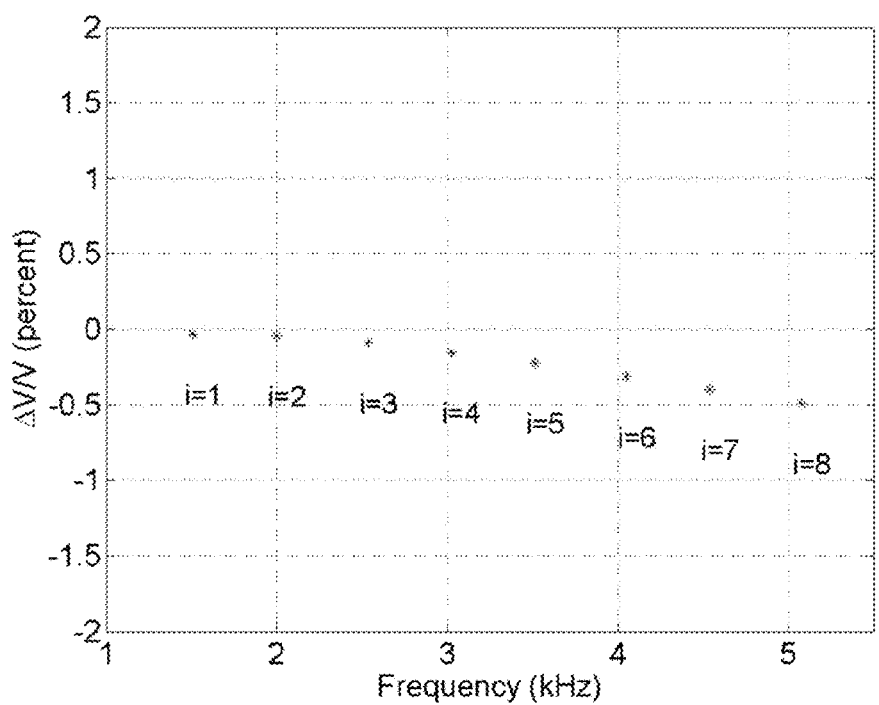
FIG. 24 depicts a graph illustrating example fractional changes in Stoneley velocity caused by a near-wellbore alteration outside a casing in a depleted reservoir.
Figure 25:
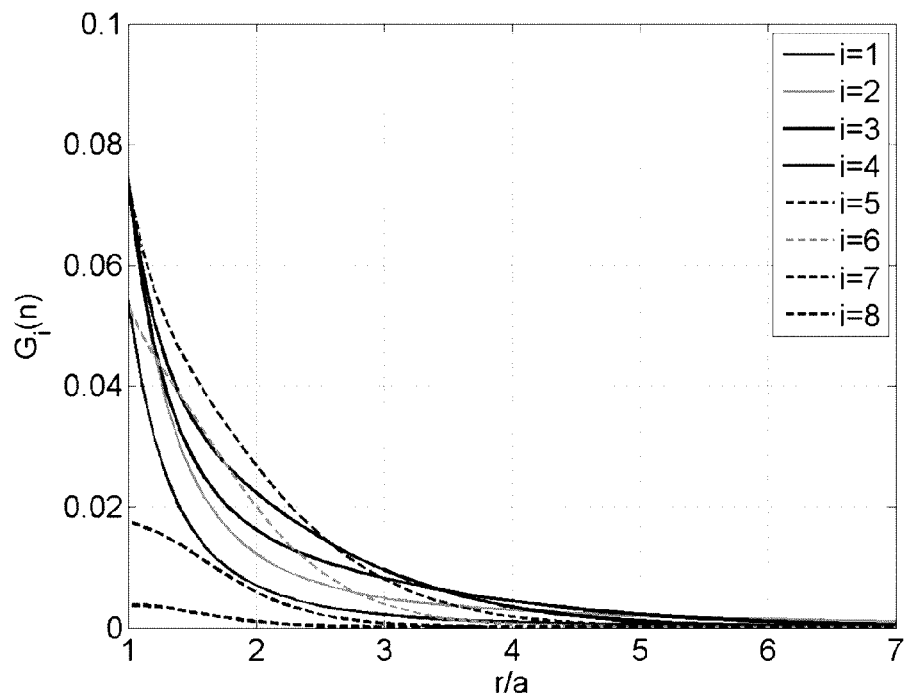
FIG. 25 depicts a graph illustrating example data kernels associated with the examples of FIGS. 23-24.

For example, consider a radially varying formation outside a 7-inch casing and having elastic properties as summarized in Table 5. The inner and outer radii of cylindrical layers (similar to the model 700 of FIG. 7) are denoted by R1 and R2, respectively. This synthetic example assumes radial alteration in shear velocity of up to about 15% right outside a cement annulus from that in the far-field, which translates into a near-wellbore shear modulus alteration of about 30% from that in the far-field. The radial extent of alteration is about three times the casing outer radius. FIG. 23 illustrates a comparison of the Stoneley dispersion 2305 for the example stair-case profile of Table 5 relative to the dispersion 2310 for a radially homogeneous formation. Notice that calculated changes in the Stoneley dispersion caused by a stair-case profile of shear velocity as shown in Table 5 are rather small compared to the radially homogeneous case. FIG. 24 illustrates the fractional changes in Stoneley velocity caused by the near-wellbore alteration outside the casing in the depleted reservoir corresponding to the parameters of Table 5. FIG. 25 depicts an example of the radial variation of the data kernel GO) for different signal frequencies denoted by i=1, 2, 3, ... 8 for this example. The data kernel $G_i$ in the integral Equation 9 is a measure of the sensitivity of fractional changes in the Stoneley phase velocity for a given fractional change in the shear modulus.

TABLE 5

| R1 (cm) | R2 (cm) | Vp (m/s) | Vs (m/s) | P (g/cc) |
|---|---|---|---|---|
| 0.0 | 4.6 | 930 | 0.0 | 4.4517 |
| 4.6 | 7.97 | 1700 | 0.0 | 1.2 |
| 7.97 | 8.89 | 5800 | 3100 | 7.9 |
| 8.89 | 10.985 | 4000 | 1720 | 2.3 |
| 10.985 | 13.985 | 4000 | 1560 | 2.3 |
| 13.985 | 16.985 | 4000 | 1620 | 2.3 |
| 16.985 | 19.985 | 4000 | 1680 | 2.3 |
| 19.985 | 25.985 | 4000 | 1740 | 2.3 |
| 25.985 | ∞ | 4000 | 1800 | 2.3 |

Figure 26:
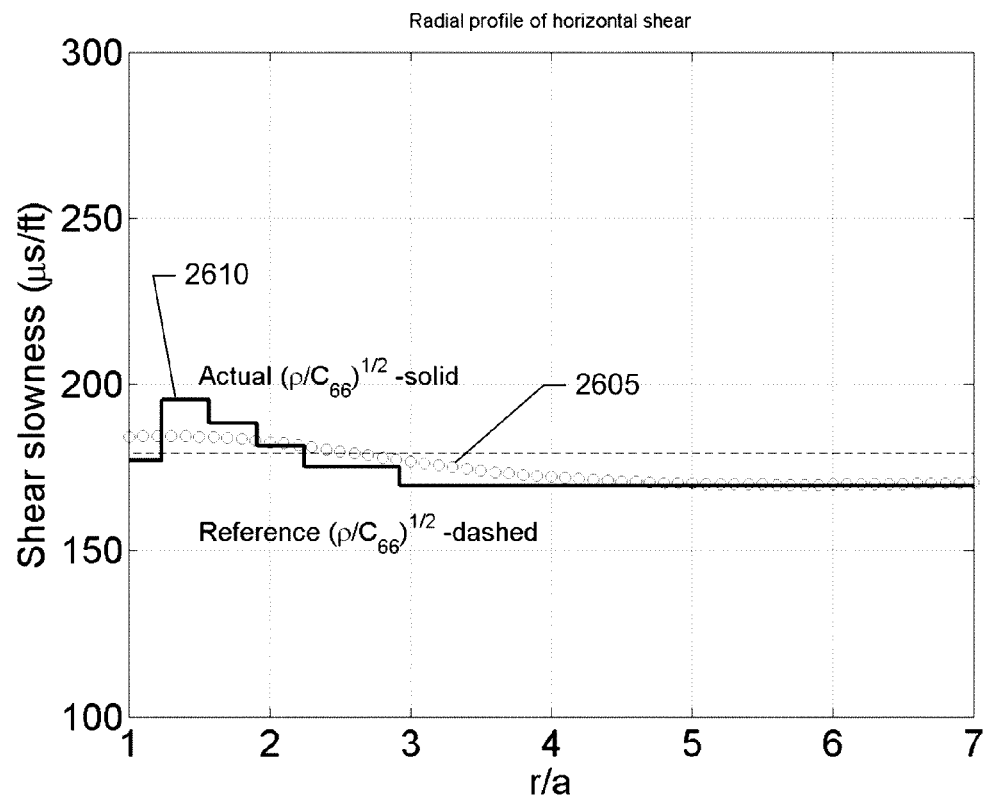
FIG. 26 depicts a graph illustrating an example estimated radial profile of Stoneley shear slowness obtained from an example synthetic Stoneley dispersion corresponding to an example illustrated staircase profile of formation shear slowness.

FIG. 26 illustrates an example inverted radial profile of the Stoneley shear slowness (corresponding to the circles 2605) obtained from the example synthetically generated Stoneley dispersion for a radially altered formation outside the casing, based on the example of Table 5. The radially altered formation is described by a stair-case profile of the shear slowness (corresponding to the line 2610 depicted in FIG. 26). As illustrated in the example of FIG. 26, good agreement is achieved between the inverted and stair-case shear slowness profile used to generate the input Stoneley dispersion.

Figure 27:
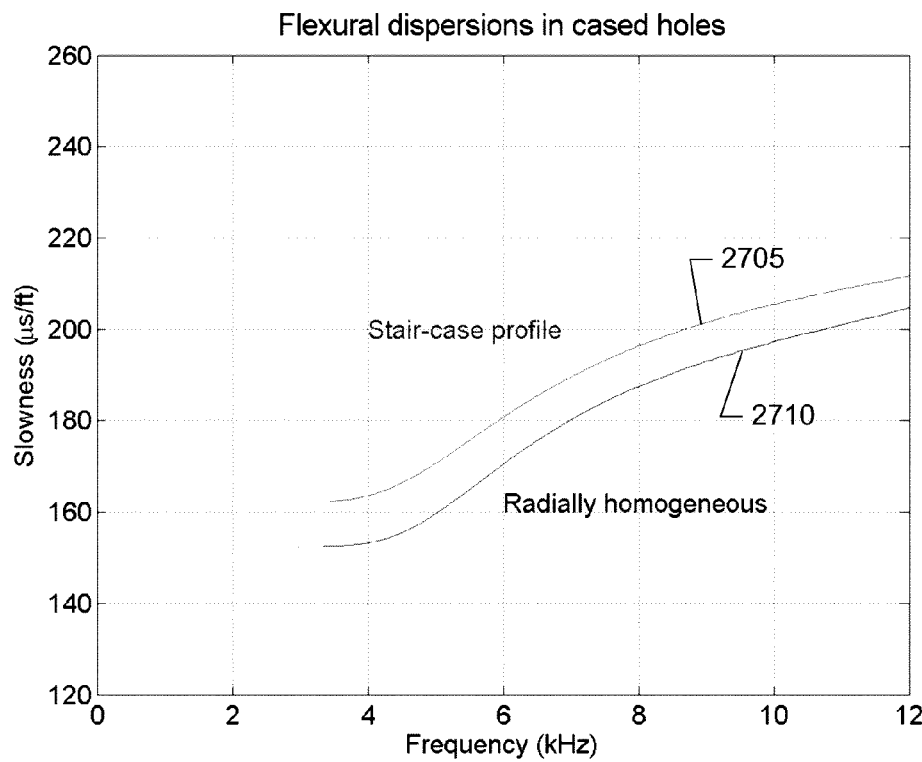
FIG. 27 depicts a graph illustrating an example flexural dispersion in a cased hole surrounded by a depleted reservoir that exhibits a reduction in the far-field shear modulus in the presence of near-wellbore alteration caused by one or more unknown sources.
Figure 28:
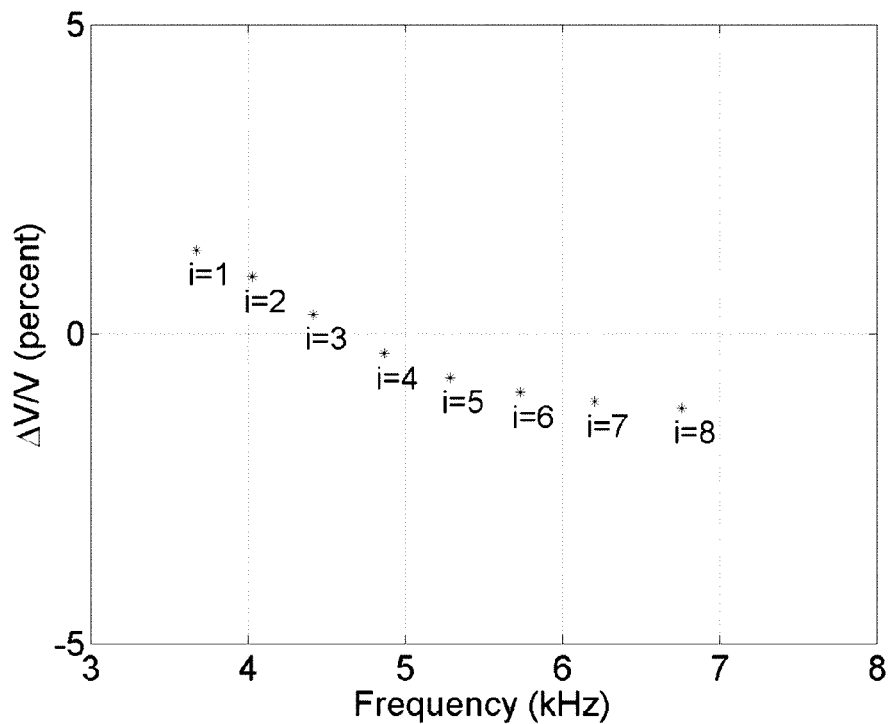
FIG. 28 depicts a graph illustrating example fractional changes in flexural velocity caused by a near-wellbore alteration outside a casing in a depleted reservoir.
Figure 29:
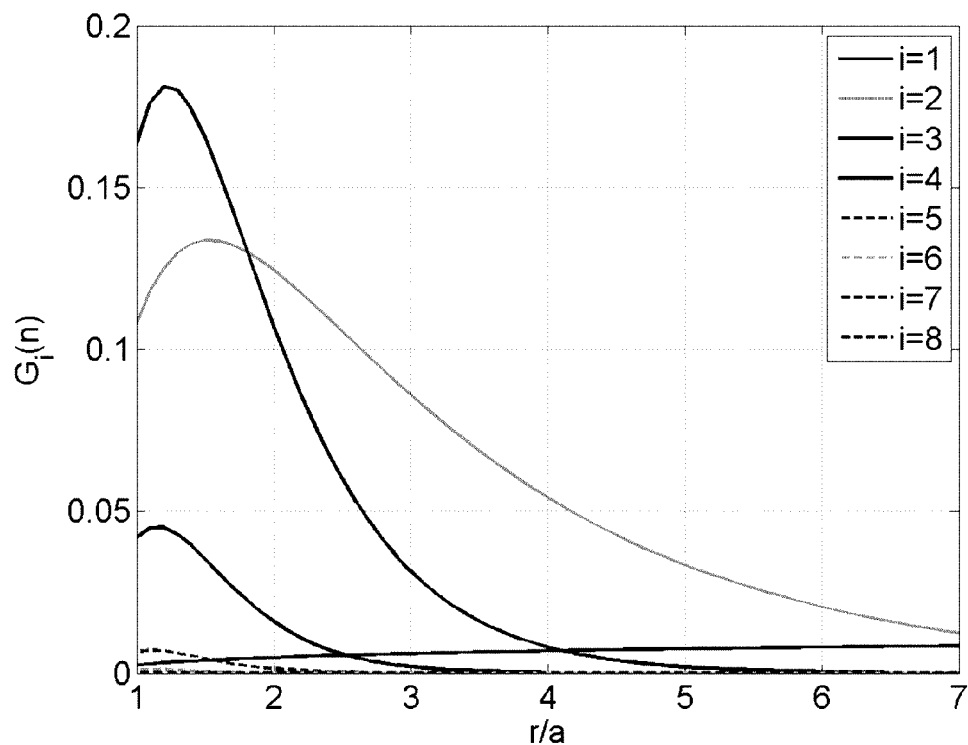
FIG. 29 depicts a graph illustrating example data kernels associated with the examples of FIGS. 27-28.
Figure 30:
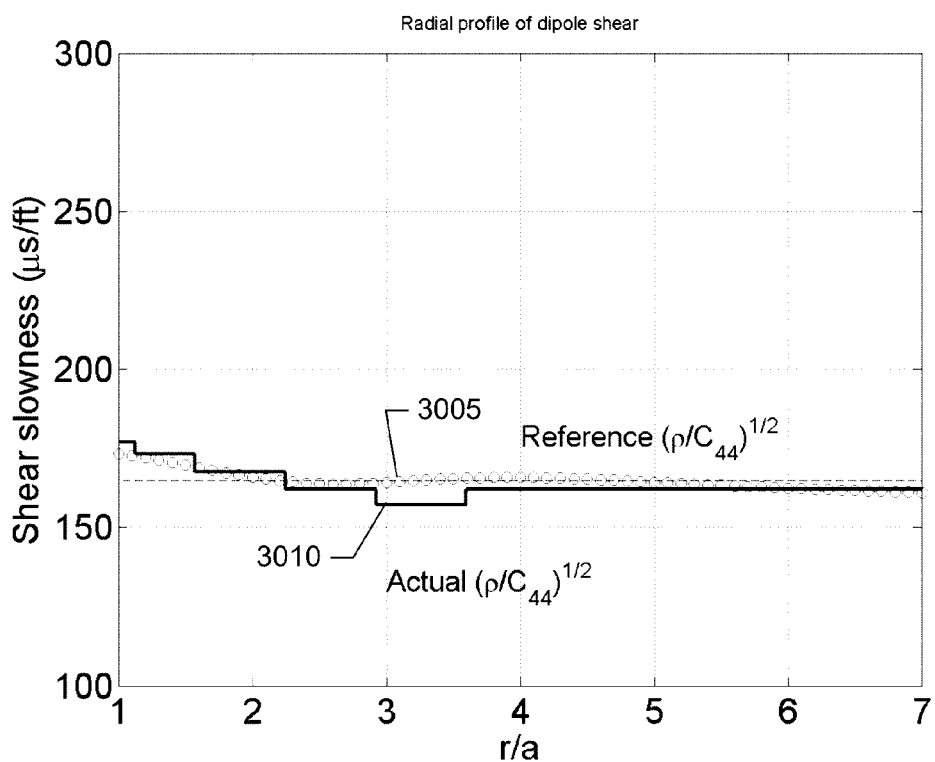
FIG. 30 depicts a graph illustrating an example estimated radial profile of flexural shear slowness obtained from an example synthetic flexural dispersion corresponding to an example illustrated staircase profile of formation shear slowness.

Next, example results for the inverted radial profile of the dipole shear slowness are described. FIG. 27 provides a comparison of dipole flexural dispersions 2705 obtained for the stair-case profile of shear velocity as shown in Table 5 relative to the dispersions 2710 obtained for a radially homogeneous formation. Notice that changes in the dipole flexural dispersion are more pronounced than those for the Stoneley dispersion shown in FIG. 23 for the same amount of radial alteration in the formation surrounding the steel casing. FIG. 28 illustrates the fractional changes in flexural velocity caused by the near-wellbore alteration outside the casing in the depleted reservoir corresponding to the parameters of Table 5. FIG. 29 depicts radial variations in the data kernel $G_f(n)$ for different frequencies that describes sensitivity of flexural dispersion to a fractional change in the formation shear modulus. These results again confirm that flexural dispersions are more sensitive to changes in the formation shear modulus outside the steel casing than those for Stoneley dispersions. FIG. 30 provides a comparison of the inverted radial profile of dipole shear slowness (corresponding to the circles 3005) obtained from the synthetic dipole dispersion in the presence of a stair-case profile of shear velocity in the formation outside the steel casing (corresponding to the line 3010 depicted in FIG. 30), based on the example of Table 5. Again, as illustrated in the example of FIG. 30, good agreement is obtained between the inverted and input stair-case profile of formation shear slowness outside the casing.

As shown in the preceding examples, cased-hole sonic data processing and interpretation in accordance with the disclosed example radial profiling techniques can provide reliable estimates of changes in reservoir stresses behind the casing that are caused by the reservoir depletion or injection of fluid. Radial profiling of the three shear moduli behind the casing can also be used to estimate the width of hydraulic fractures introduced to enhance production of hydrocarbons from tight reservoirs. As another example, completion of a chalk reservoir may involve an acidization process to enhance near-wellbore fluid mobility. Radial variations of shear moduli as determined by the disclosed example radial profiling techniques from cased-hole sonic data can be used to assess the effectiveness of acidization in improving the flow into a producing well.

While example manners of implementing radial profiling processor 800 have been illustrated in FIG. 8, one or more of the elements, processes and/or devices illustrated in FIG. 8 may be combined, divided, re-arranged, omitted and/or implemented in any other way. Further, the example waveform interface 805, the example measured dispersion determiner 810, the example reference moduli estimator 815, the example reference dispersion generator 820, the example dispersion variation calculator 825, the example data kernel calculator 830, the example radial moduli variation profiler 835, the example radial slowness variation profiler 840, the example results interface 845 and/or, more generally, the example radial profiling processor 800 may be implemented by hardware, software, firmware and/or any combination of hardware, software and/or firmware. Thus, for example, any of the example waveform interface 805, the example measured dispersion determiner 810, the example reference moduli estimator 815, the example reference dispersion generator 820, the example dispersion variation calculator 825, the example data kernel calculator 830, the example radial moduli variation profiler 835, the example radial slowness variation profiler 840, the example results interface 845 and/or, more generally, the example radial profiling processor 800 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example radial profiling processor 800, the example waveform interface 805, the example measured dispersion determiner 810, the example reference moduli estimator 815, the example reference dispersion generator 820, the example dispersion variation calculator 825, the example data kernel calculator 830, the example radial moduli variation profiler 835, the example radial slowness variation profiler 840 and/or the example results interface 845 are hereby expressly defined to include a tangible computer readable medium such as a memory, digital versatile disk (DVD), compact disk (CD), etc., storing such software and/or firmware. Further still, the example radial profiling processor 800 may include one or more elements, processes and/or devices in addition to, or instead of, those illustrated in FIG. 8, and/or may include more than one of any or all of the illustrated elements, processes and devices.

Flowcharts representative of example processes that may be executed to implement the example radial profiling processor 800, the example waveform interface 805, the example measured dispersion determiner 810, the example reference moduli estimator 815, the example reference dispersion generator 820, the example dispersion variation calculator 825, the example data kernel calculator 830, the example radial moduli variation profiler 835, the example radial slowness variation profiler 840 and/or the example results interface 845 are shown in FIGS. 31A-33B. In these examples, the process represented by each flowchart may be implemented by one or more programs comprising machine readable instructions for execution by a processor, such as the processor 3412 shown in the example processing system 3400 discussed below in connection with FIG. 34. In some examples, the entire program or programs and/or portions thereof implementing one or more of the processes represented by the flowcharts of FIGS. 31A-33B could be executed by a device other than the processor 3412 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 31A-33B, or one or more portion(s) thereof, may be implemented manually. Further, although the example processes are described with reference to the flowcharts illustrated in FIGS. 31A-33B, many other techniques for implementing the example methods and apparatus described herein may be used. For example, with reference to the flowcharts illustrated in FIGS. 31A-33B, the order of execution of the blocks may be changed, and/or some of the blocks described may be changed, omitted, combined and/or subdivided into multiple blocks.

As mentioned above, the example processes of FIGS. 31A-33B may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. The example processes of FIGS. 31A-33B may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 31A:
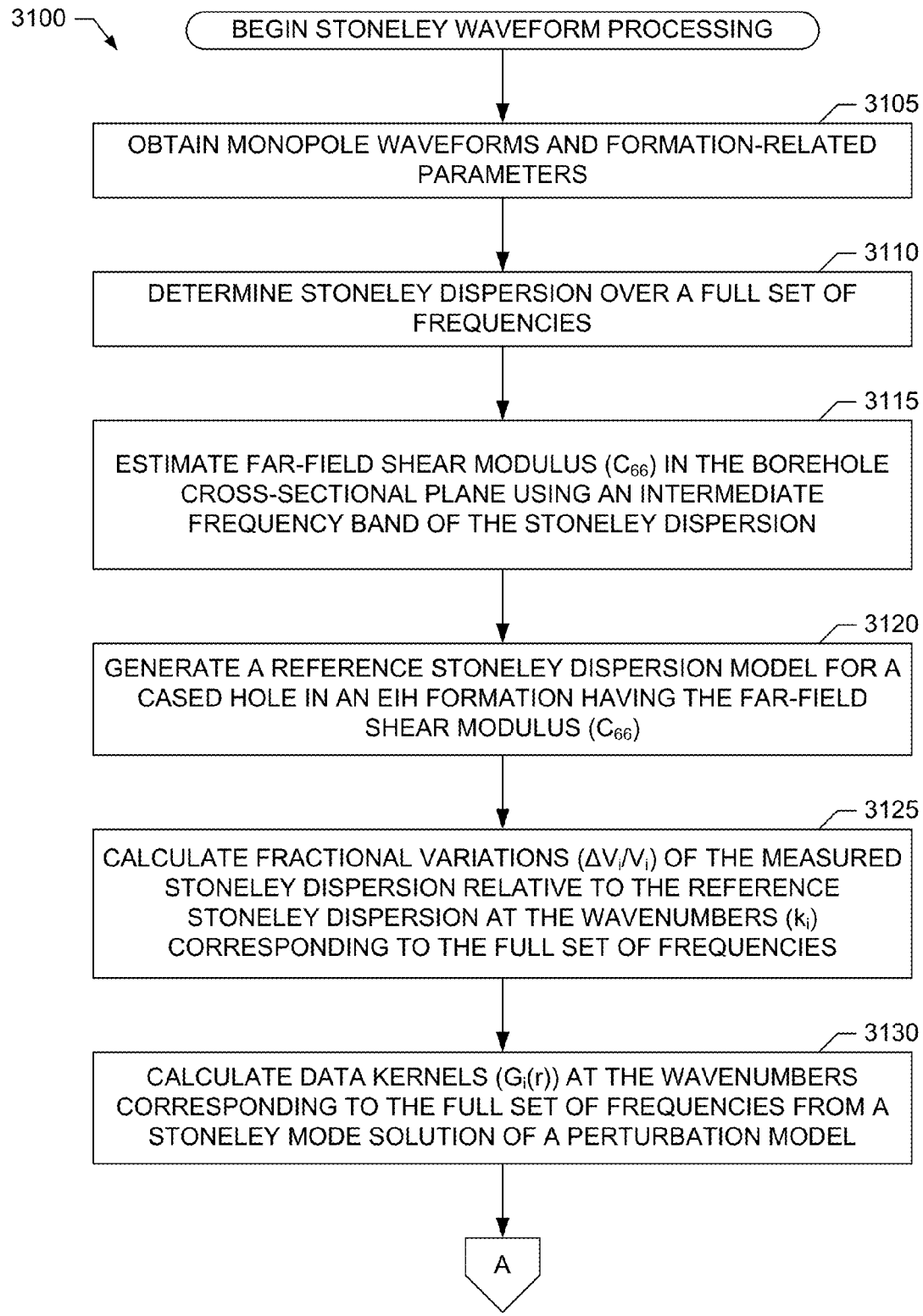
FIGS. 31A-B collectively are a flowchart representative of an example process that may be performed to implement Stoneley waveform processing in the example radial profiling processor of FIG. 8 to obtain radial variation of the Stoneley shear slowness using monopole waveforms.
Figure 31B:
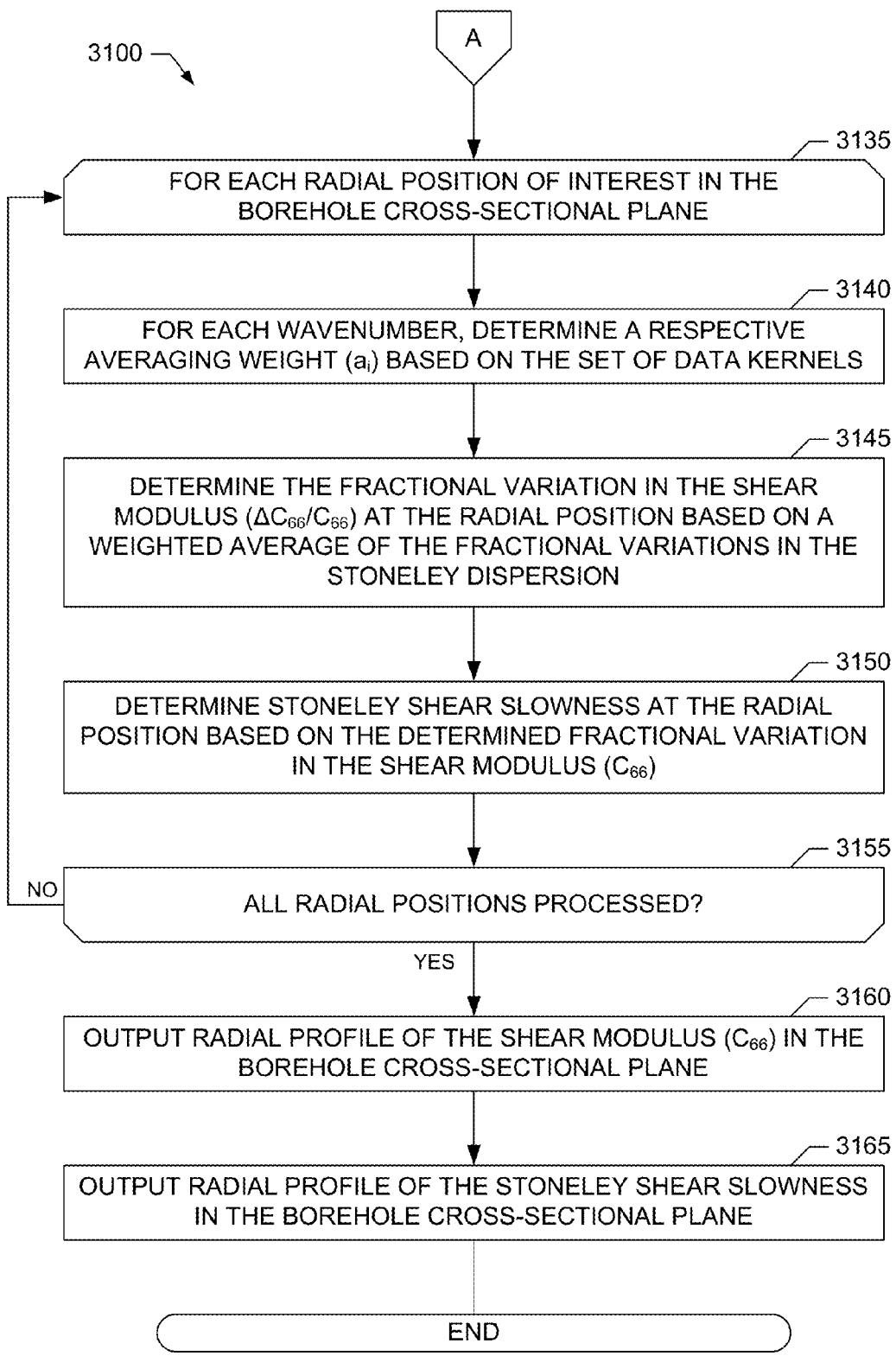

An example process 3100 that may be executed to implement Stoneley waveform processing in the example radial profiling processor 800 of FIG. 8 is illustrated in FIGS. 31A-B. The process 3100 of the illustrated example processes monopole waveforms obtained from the sonic measurement device 500 of FIG. 5 included in the LWD module 120/120A and/or the MWD module 130 of FIG. 1 to determine the radial variation of the shear modulus $C_{66}$ and the Stoneley shear slowness in the borehole cross-sectional plane of the formation. With reference to the preceding figures and associated descriptions, the example process 3100 begins execution at block 3105 of FIG. 31A at which the waveform interface 805 of the radial profiling processor 800 obtains monopole waveforms associated with a particular borehole depth in the formation from the sonic measurement device 500, as described above. At block 3105, the radial profiling processor 800 also obtains (e.g., via measurement and/or as input parameters) various formation-related parameters and parameters for modeling the tool structure, such as the density of the heavy-fluid column used to model tool effects, the borehole fluid compressional velocity and mass density, the casing material mass density, compressional and shear velocities, the casing inner and outer diameters, the formation mass density, compressional, and shear velocities, etc.

At block 3110, the measured dispersion determiner 810 of the radial profiling processor 800 measures, using any appropriate technique, the Stoneley wave velocities for different wavenumbers over a desired frequency range from the monopole measurements obtained at block 3105, as described above. At block 3115, the reference moduli estimator 815 of the radial profiling processor 800 determines a reference value (e.g., far-field value) of the shear modulus $C_{66}$ (i.e., the shear modulus associated with the borehole cross-sectional plane of the formation) from the Stoneley wave dispersion obtained at block 3110. For example, at block 3115, the reference moduli estimator 815 uses any appropriate inversion technique with the parameters obtained at block 3105 and assuming the formation is effectively isotropic and radially homogenous to invert an intermediate frequency band (e.g., such as from 1 to 3 kHz) of the Stoneley dispersions determined at block 3110 to obtain the reference shear modulus $C_{66}$, as described above.

At block 3120, the reference dispersion generator 820 of the radial profiling processor 800 generates reference Stoneley wave velocities for different wavenumbers using any appropriate dispersion inversion technique and assuming that the formation is effectively isotropic and radially homogenous. In the illustrated example, the reference dispersion generator 820 uses the reference shear modulus $C_{66}$ (or, equivalently, a reference shear velocity per Equation 1) estimated at block 3115 to determine the reference Stoneley wave dispersion at block 3120. At block 3125, the dispersion variation calculator 825 of the radial profiling processor 800 determines the fractional variations of the Stoneley wave velocities for different wavenumbers. As described above, the fractional variation of the Stoneley wave velocity for a given wavenumber is determined by the dispersion variation calculator 825 to be the ratio of: (i) a difference between the measured value and the reference value of the Stoneley wave velocity for the given wavenumber, to (ii) the reference value of the Stoneley wave velocity for the given wavenumber (see Equation 5).

At block 3130, the data kernel calculator 830 of the radial profiling processor 800 calculates, as described above, the data kernels $G_i(r)$ over the axial wavenumbers $k_i$ from the Stoneley mode solution of the perturbation model given by Equation 4 through Equation 7. Next, at block 3135 of FIG. 31B, the radial profiling processor 800 begins iterating over each radial position of interest in the borehole cross-sectional plane. At block 3140, the radial moduli variation profiler 835 of the radial profiling processor 800 determines the averaging weight, $a_i$, for each wavenumber, $k_i$ for i=1, 2, . . . N), based on the data kernels $G_i(r)$ determined at block 3130. For example, at block 3140, the radial moduli variation profiler 835 uses the data kernels $G_i(r)$ to implement Equation 21 to determine the averaging weights, $a_i$ for the current radial position being processed.

At block 3145, the radial moduli variation profiler 835 determines the fractional variation of the shear modulus $C_{66}$ for the current radial position being processed, represented mathematically as $\Delta C_{66}(r_o)/C_{66}$, based on the weighted average of the fractional variations in the Stoneley velocities ($\gamma_i = \Delta V_i/V_i$) determined at block 3125. At block 3145, the radial moduli variation profiler 835 uses the weights determined at block 3140 to perform the weighted averaging/combining of Equation 20. At block 3150, the radial slowness variation profiler 840 determines the Stoneley shear slowness at the current radial position being processed. For example, at block 3150, the radial slowness variation profiler 840 can use the relationship between the shear modulus $C_{66}$ and the Stoneley shear slowness given by Equation 1 to determine the Stoneley shear slowness at the current radial position being processed. The processing at blocks 3140-3150 then repeats until the radial positions of interest have been processed (see block 3155).

At block 3160, the results interface 845 of the radial profiling processor 800 outputs a radial profile of the shear modulus $C_{66}$ associated with the borehole cross-sectional plane at the current depth being processed. At block 3165, the results interface 845 outputs a radial profile of the Stoneley shear velocity associated with the borehole cross-sectional plane at the current depth being processed. Execution of the example process 3100 then ends.

Figure 32A:
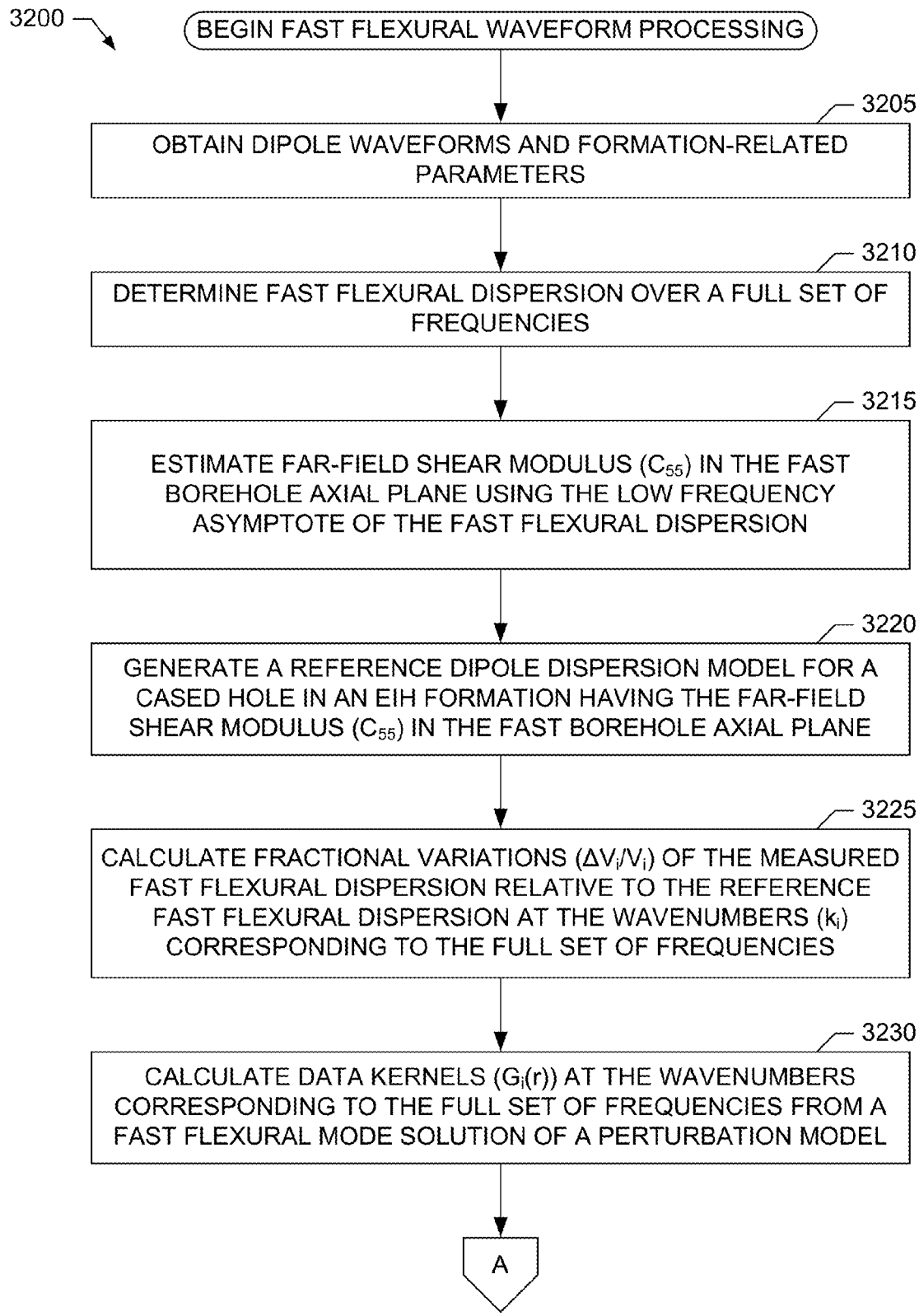
FIGS. 32A-B collectively are a flowchart representative of an example process that may be performed to implement fast flexural waveform processing in the example radial profiling processor of FIG. 8 to obtain radial variation of the fast flexural shear slowness using cross-dipole waveforms.
Figure 32B:
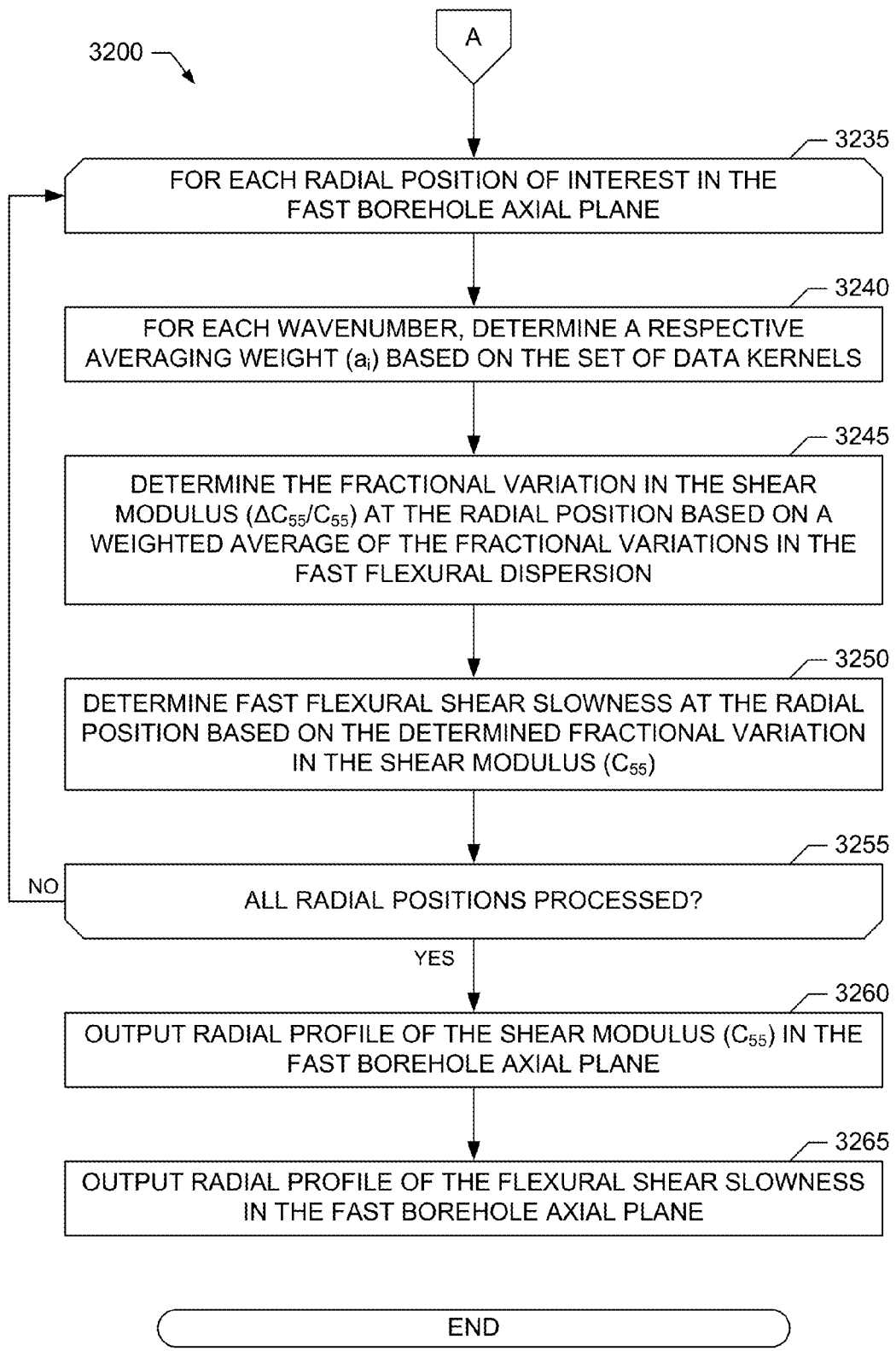

An example process 3200 that may be executed to implement fast flexural waveform processing in the example radial profiling processor 800 of FIG. 8 is illustrated in FIGS. 32A-B. The process 3200 of the illustrated example processes dipole waveforms obtained from the sonic measurement device 500 of FIG. 5 included in the LWD module 120/120A and/or the MWD module 130 of FIG. 1 to determine the radial variation of the shear modulus $C_{55}$ and the flexural shear slowness in the fast borehole axial plane of the formation. With reference to the preceding figures and associated descriptions, the example process 3200 begins execution at block 3205 of FIG. 32A at which the waveform interface 805 of the radial profiling processor 800 obtains dipole waveforms associated with a particular borehole depth in the formation from the sonic measurement device 500, as described above. At block 3205, the radial profiling processor 800 also obtains (e.g., via measurement and/or as input parameters) various formation-related parameters and parameters for modeling the tool structure, such as the density of the heavy-fluid column used to model tool effects, the borehole fluid compressional velocity and mass density, the casing material mass density, compressional and shear velocities, the casing inner and outer diameters, the formation mass density, compressional, and shear velocities, etc.

At block 3210, the measured dispersion determiner 810 of the radial profiling processor 800 measures, using any appropriate technique, the fast flexural wave velocities for different wavenumbers over a desired frequency range from the dipole measurements obtained at block 3205, as described above. At block 3215, the reference moduli estimator 815 of the radial profiling processor 800 determines a reference value (e.g., far-field value) of the shear modulus $C_{55}$ (i.e., the shear modulus associated with the fast borehole axial plane of the formation) from the fast flexural wave dispersion obtained at block 3110. For example, at block 3215, the reference moduli estimator 815 uses any appropriate inversion technique with the parameters obtained at block 3205 and assuming the formation is effectively isotropic and radially homogenous to determine the low frequency asymptote of the fast flexural dispersion determined at block 3210 to obtain the reference sheaf modulus $C_{55}$, as described above.

At block 3220, the reference dispersion generator 820 of the radial profiling processor 800 generates reference fast flexural wave velocities for different wavenumbers using any appropriate dispersion inversion technique and assuming that the formation is effectively isotropic and radially homogenous. In the illustrated example, the reference dispersion generator 820 uses the reference shear modulus $C_{55}$ (or, equivalently, a reference shear velocity per Equation 3) estimated at block 3215 to determine the reference fast flexural wave dispersion at block 3220. At block 3225, the dispersion variation calculator 825 of the radial profiling processor 800 determines the fractional variations of the fast flexural; wave velocities for different wavenumbers. As described above, the fractional variation of the fast flexural wave velocity for a given wavenumber is determined by the dispersion variation calculator 825 to be the ratio of: (i) a difference between the measured value and the reference value of the fast flexural wave velocity for the given wavenumber, to (ii) the reference value of the fast flexural wave velocity for the given wavenumber (see Equation 5).

At block 3230, the data kernel calculator 830 of the radial profiling processor 800 calculates, as described above, the data kernels $G_i(r)$ over the axial wavenumbers $k_i$ from the fast flexural mode solution of the perturbation model given by Equation 4 through Equation 7. Next, at block 3235 of FIG. 32B, the radial profiling processor 800 begins iterating over each radial position of interest in the fast borehole axial plane. At block 3240, the radial moduli variation profiler 835 of the radial profiling processor 800 determines the averaging weight, for each wavenumber, $k_i$ (for i=1, 2, . . . N), based on the data kernels GM determined at block 3230. For example, at block 3240, the radial moduli variation profiler 835 uses the data kernels $G_i(r)$ to implement Equation 21 to determine the averaging weights, $a_i$, for the current radial position being processed.

At block 3245, the radial moduli variation profiler 835 determines the fractional variation of the shear modulus $C_{55}$ for the current radial position being processed, represented mathematically as $\Delta C_{55}(r_o)/C_{55}$, based on the weighted average of the fractional variations in the fast flexural velocities ($\gamma_i = \Delta V_i/V_i$) determined at block 3225. At block 3245, the radial moduli variation profiler 835 uses the weights determined at block 3240 to perform the weighted averaging/combining of Equation 20. At block 3250, the radial slowness variation profiler 840 determines the fast flexural shear slowness at the current radial position being processed. For example, at block 3250, the radial slowness variation profiler 840 can use the relationship between the shear modulus $C_{55}$ and the fast flexural shear slowness given by Equation 3 to determine the fast flexural shear slowness at the current radial position being processed. The processing at blocks 3240-3250 then repeats until the radial positions of interest have been processed (see block 3255).

At block 3260, the results interface 845 of the radial profiling processor 800 outputs a radial profile of the shear modulus $C_{55}$ associated with the fast borehole axial plane at the current depth being processed. At block 3265, the results interface 845 outputs a radial profile of the fast flexural shear velocity associated with the fast borehole axial plane at the current depth being processed. Execution of the example process 3200 then ends.

Figure 33A:
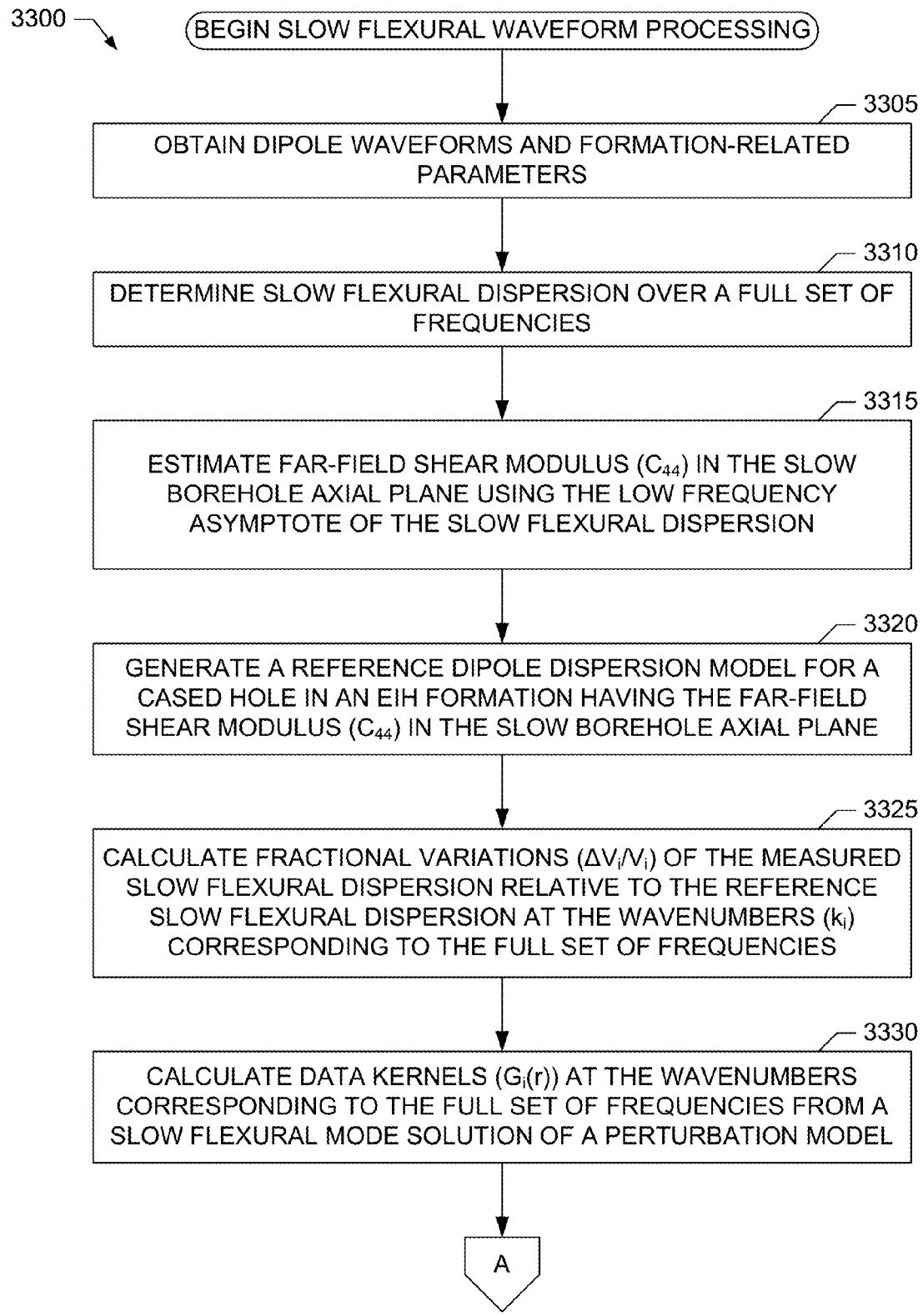
FIGS. 33A-B collectively are a flowchart representative of an example process that may be performed to implement slow flexural waveform processing in the example radial profiling processor of FIG. 8 to obtain radial variation of the slow flexural shear slowness using cross-dipole waveforms.
Figure 33B:
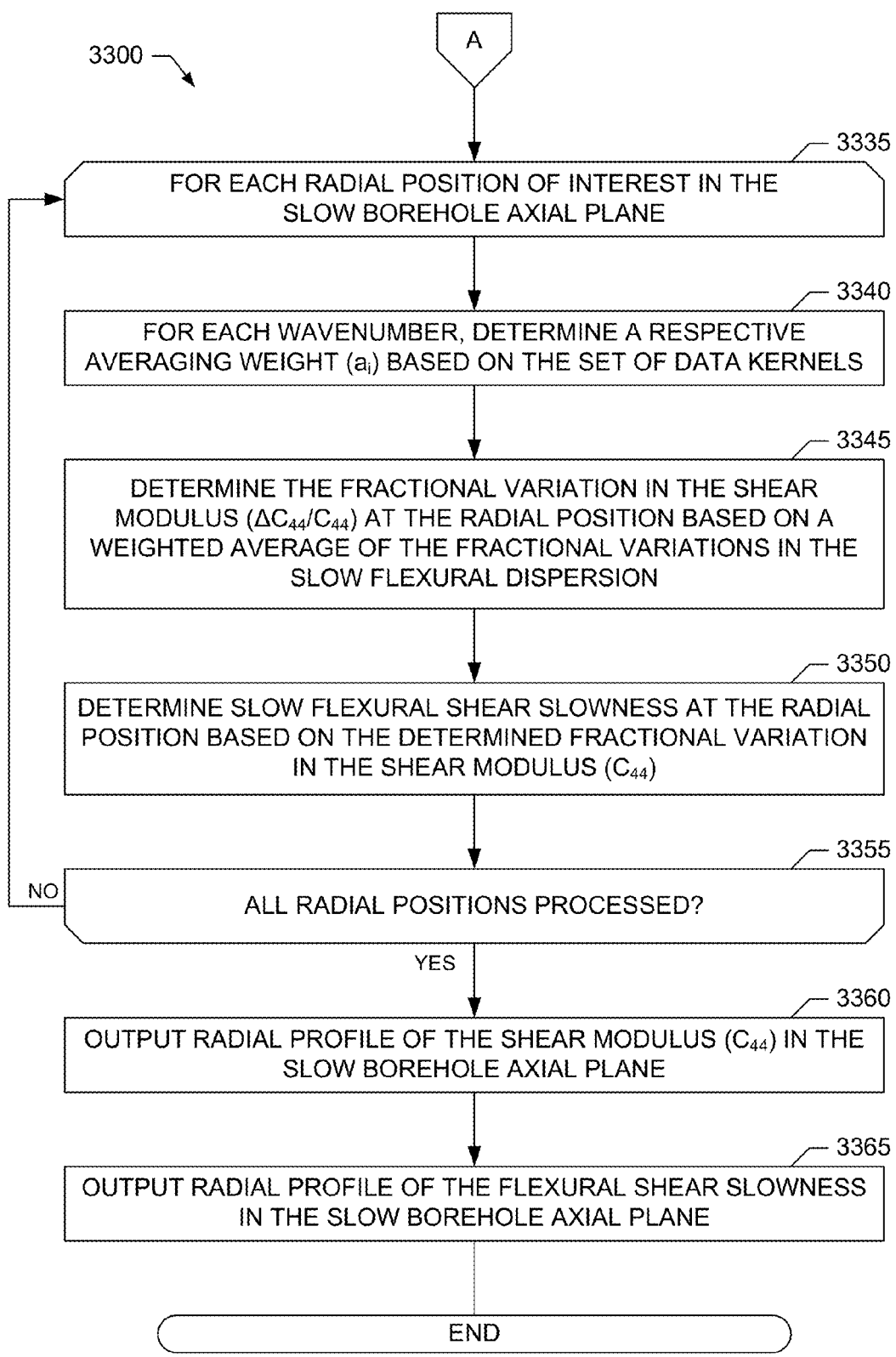

An example process 3300 that may be executed to implement slow flexural waveform processing in the example radial profiling processor 800 of FIG. 8 is illustrated in FIGS. 33A-B. The process 3300 of the illustrated example processes dipole waveforms obtained from the sonic measurement device 500 of FIG. 5 included in the LWD module 120/120A and/or the MWD module 130 of FIG. 1 to determine the radial variation of the shear modulus $C_{44}$ and the flexural shear slowness in the slow borehole axial plane of the formation. With reference to the preceding figures and associated descriptions, the example process 3300 begins execution at block 3305 of FIG. 33A at which the waveform interface 805 of the radial profiling processor 800 obtains dipole waveforms associated with a particular borehole depth in the formation from the sonic measurement device 500, as described above. At block 3305, the radial profiling processor 800 also obtains (e.g., via measurement and/or as input parameters) various formation-related parameters and parameters for modeling the tool structure, such as the density of the heavy-fluid column used to model tool effects, the borehole fluid compressional velocity and mass density, the casing material mass density, compressional and shear velocities, the casing inner and outer diameters, the formation mass density, compressional, and shear velocities, etc.

At block 3310, the measured dispersion determiner 810 of the radial profiling processor 800 measures, using any appropriate technique, the slow flexural wave velocities for different wavenumbers over a desired frequency range from the dipole measurements obtained at block 3305, as described above. At block 3315, the reference moduli estimator 815 of the radial profiling processor 800 determines a reference value (e.g., far-field value) of the shear modulus $C_{44}$ (i.e., the shear modulus associated with the slow borehole axial plane of the formation) from the slow flexural wave dispersion obtained at block 3110. For example, at block 3315, the reference moduli estimator 815 uses any appropriate inversion technique with the parameters obtained at block 3305 and assuming the formation is effectively isotropic and radially homogenous to determine the low frequency asymptote of the slow flexural dispersion determined at block 3310 to obtain the reference shear modulus $C_{44}$, as described above.

At block 3220, the reference dispersion generator 820 of the radial profiling processor 800 generates reference slow flexural wave velocities for different wavenumbers using any appropriate dispersion inversion technique and assuming that the formation is effectively isotropic and radially homogenous. In the illustrated example, the reference dispersion generator 820 uses the reference shear modulus $C_{44}$ (or, equivalently, a reference shear velocity per Equation 2) estimated at block 3315 to determine the reference slow flexural wave dispersion at block 3320. At block 3325, the dispersion variation calculator 825 of the radial profiling processor 800 determines the fractional variations of the slow flexural; wave velocities for different wavenumbers. As described above, the fractional variation of the slow flexural wave velocity for a given wavenumber is determined by the dispersion variation calculator 825 to be the ratio of: (i) a difference between the measured value and the reference value of the slow flexural wave velocity for the given wavenumber, to (ii) the reference value of the slow flexural wave velocity for the given wavenumber (see Equation 5).

At block 3330, the data kernel calculator 830 of the radial profiling processor 800 calculates, as described above, the data kernels $G_i(r)$ over the axial wavenumbers $k_i$ from the slow flexural mode solution of the perturbation model given by Equation 4 through Equation 7. Next, at block 3335 of FIG. 33B, the radial profiling processor 800 begins iterating over each radial position of interest in the slow borehole axial plane. At block 3340, the radial moduli variation profiler 835 of the radial profiling processor 800 determines the averaging weight, $a_i$, for each wavenumber, $k_i$ (for i=1, 2, . . . N), based on the data kernels $G_i(r)$ determined at block 3330. For example, at block 3340, the radial moduli variation profiler 835 uses the data kernels $G_i(r)$ to implement Equation 21 to determine the averaging weights, $a_i$, for the current radial position being processed.

At block 3245, the radial moduli variation profiler 835 determines the fractional variation of the shear modulus $C_{44}$ for the current radial position being processed, represented mathematically as $\Delta C_{44}(r_o)/C_{44}$, based on the weighted average of the fractional variations in the slow flexural velocities ($\gamma_i=\Delta V_i/V_i$) determined at block 3325. At block 3345, the radial moduli variation profiler 835 uses the weights determined at block 3340 to perform the weighted averaging/combining of Equation 20. At block 3350, the radial slowness variation profiler 840 determines the slow flexural shear slowness at the current radial position being processed. For example, at block 3350, the radial slowness variation profiler 840 can use the relationship between the shear modulus $C_{44}$ and the slow flexural shear slowness given by Equation 2 to determine the slow flexural shear slowness at the current radial position being processed. The processing at blocks 3340-3350 then repeats until the radial positions of interest have been processed (see block 3355).

At block 3360, the results interface 845 of the radial profiling processor 800 outputs a radial profile of the shear modulus $C_{44}$ associated with the slow borehole axial plane at the current depth being processed. At block 3365, the results interface 845 outputs a radial profile of the slow flexural shear velocity associated with the fast slow axial plane at the current depth being processed. Execution of the example process 3300 then ends.

Figure 34:
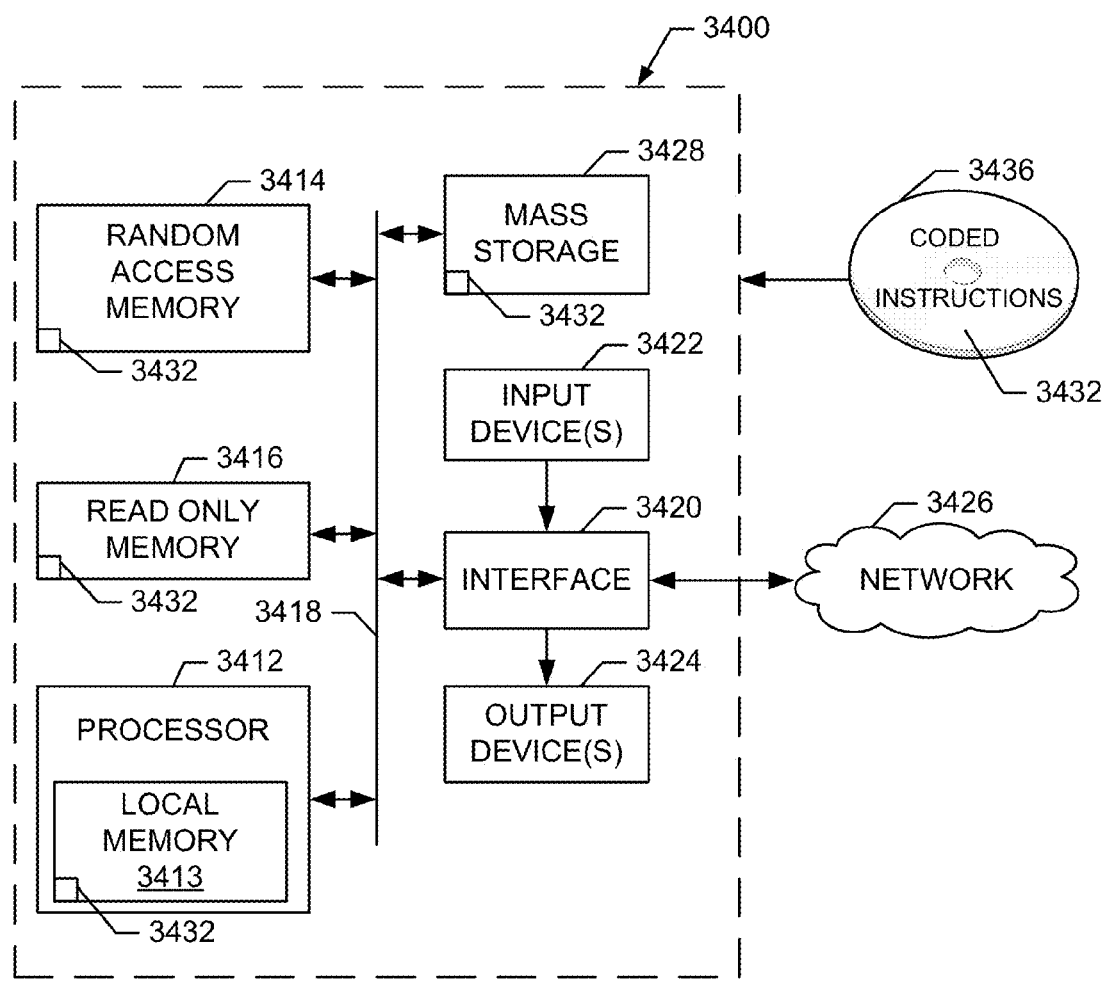
FIG. 34 is a block diagram of an example processing system that may execute example machine readable instructions used to implement one or more of the processes of FIGS. 31A-B, 32A-B and/or 33A-B to implement the example radial profiling processor of FIG. 8.

FIG. 34 is a block diagram of an example processing system 3400 capable of executing the processes of FIGS. 31A-33B to implement the example radial profiling processor 800, the example waveform interface 805, the example measured dispersion determiner 810, the example reference moduli estimator 815, the example reference dispersion generator 820, the example dispersion variation calculator 825, the example data kernel calculator 830, the example radial moduli variation profiler 835, the example radial slowness variation profiler 840 and/or the example results interface 845 of FIG. 8. The processing system 3400 can be, for example, a smart controller, a special-purpose computing device, a server, a personal computer, a personal digital assistant (FDA), a smartphone, an Internet appliance, etc., or any other type of computing device.

The system 3400 of the instant example includes a processor 3412. For example, the processor 3412 can be implemented by one or more microprocessors and/or controllers from any desired family or manufacturer.

The processor 3412 includes a local memory 3413 (e.g., a cache) and is in communication with a main memory including a volatile memory 3414 and a non-volatile memory 3416 via a bus 3418. The volatile memory 3414 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3416 may be implemented by flash memory and/or any other desired type of memory device. Access to the main memory 3414, 3416 is controlled by a memory controller.

The processing system 3400 also includes an interface circuit 3420. The interface circuit 3420 may be implemented by any type of interface standard, such as an Ethernet interface, a universal serial bus (USB), and/or a PCI express interface.

One or more input devices 3422 are connected to the interface circuit 3420. The input device(s) 3422 permit a user to enter data and commands into the processor 3412. The input device(s) can be implemented by, for example, a keyboard, a mouse, a touchscreen, a track-pad, a trackball, a trackbar (such as an isopoint), a voice recognition system and/or any other human-machine interface.

One or more output devices 3424 are also, connected to the interface circuit 3420. The output devices 3424 can be implemented, for example, by display devices (e.g., a liquid crystal display, a cathode ray tube display (CRT)), a printer and/or speakers. The example interface circuit 3420, thus, includes a graphics driver card.

The interface circuit 3420 also includes a communication device, such as a modem or network interface card, to facilitate exchange of data with external computers via a network 3426 (e.g., an Ethernet connection, a digital subscriber line (DSL), a telephone line, coaxial cable, a cellular telephone system, etc.).

The processing system 3400 also includes one or more mass storage devices 3428 for storing machine readable instructions and data. Examples of such mass storage devices 3428 include floppy disk drives, hard drive disks, compact disk drives and digital versatile disk (DVD) drives.

Coded instructions 3432 corresponding to the instructions of FIGS. 31A-B, 32A-B and/or 33A-B may be stored in the mass storage device 3428, in the volatile memory 3414, in the non-volatile memory 3416, in the local memory 3413 and/or on a removable storage medium, such as a CD or DVD 3436.

As an alternative to implementing the methods and/or apparatus described herein in a system such as the processing system of FIG. 34, the methods and or apparatus described herein may be embedded in a structure such as a processor and/or an ASIC (application specific integrated circuit).

Although a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to determine a radial profile of shear parameters for a formation including a cased borehole, the method comprising:

measuring Stoneley waveforms and dipole sonic waveforms in the cased borehole by a sonic tool;

determining a fractional variation of a first shear modulus at a first radial position from the borehole based on a first weighted average of fractional variations of Stoneley wave velocities for different wavenumbers, the first weighted average being based on first weights determined using a perturbation model including parameters to model the borehole casing;

determining fractional variations of second and third shear moduli at respective second and third radial positions from the borehole based on second and third weighted averages of fractional variations of respective first and second flexural wave velocities for different wavenumbers, the first and second flexural wave velocities associated with respective first and second orthogonal borehole axial planes of the formation, the second and third weighted averages being based on respective second and third weights determined using the perturbation model;

determining a radial profile of the first shear modulus at a set of radial positions from the borehole in a borehole cross-sectional plane of the formation based on fractional variations of the first shear modulus determined at the respective set of radial positions from the borehole;

determining respective radial profiles of the second and third shear moduli at respective second and third sets of radial positions from the borehole in the respective first and second orthogonal borehole axial planes of the formation based on respective fractional variations of the second and third shear moduli determined at the respective second and third sets of radial positions from the borehole;

determining respective radial profiles of the shear slownesses at the respective second and third sets of radial positions from the borehole in the respective first and second orthogonal borehole axial planes of the formation based on the respective radial profiles of the second and third shear moduli; and determining the radial profile of the shear parameters for the formation including the cased borehole; wherein the shear parameters comprise the shear moduli and the shear slowness.

2. A method as defined in claim 1 wherein the first shear modulus is associated with a borehole cross-sectional plane of the formation, and the second and third shear moduli are associated respectively with the first and second orthogonal borehole axial planes.

3. A method as defined in claim 2 wherein the first borehole axial plane is associated with a fast flexural shear velocity determinable from the first flexural wave velocities, and the second borehole axial plane is associated with a slow flexural shear velocity determinable from the second flexural wave velocities.

4. A method as defined in claim 1 wherein the fractional variation of the first shear modulus at the first radial position from the borehole comprises a ratio of a difference between an estimated value of the first shear modulus at the first radial position and a reference value of the first shear modulus to the reference value of the first shear modulus, the reference value of the first shear modulus corresponding to a far-field value of the first shear modulus determined from the Stoneley wave velocities assuming the formation is effectively isotropic and radially homogenous, the fractional variations of the Stoneley wave velocities for the different wavenumbers include a first fractional variation of the Stoneley wave velocity for a first wavenumber, the first fractional variation of the Stoneley wave velocity comprises a ratio of a difference between a measured value and a reference value of the Stoneley wave velocity for the first wavenumber to the reference value of the Stoneley wave velocity for the first wavenumber, and the reference value of the Stoneley wave velocity for the first wavenumber is determined assuming the formation is effectively isotropic and radially homogenous.

5. A method as defined in claim 1 wherein the fractional variations of the second and third shear moduli include a fractional variation of the second shear modulus and a fractional variation of the third shear modulus at a first radial position from the borehole, the fractional variation of the second shear modulus comprises a ratio of a difference between an estimated value of the second shear modulus at the first radial position and a reference value of the second shear modulus to the reference value of the second shear modulus, the reference value of the second shear modulus corresponding to a far-field value of the second shear modulus determined from the first flexural wave velocities assuming the formation is effectively isotropic and radially homogenous, the fractional variations of the first flexural wave velocities for the different wavenumbers include a first fractional variation of the first flexural wave velocity for a first wavenumber, the first fractional variation of the first flexural wave velocity comprises a ratio of a difference between a measured value and a reference value of the first flexural wave velocity for the first wavenumber to the reference value of the first flexural wave velocity for the first wavenumber, and the reference value of the first flexural wave velocity for the first wavenumber is determined assuming the formation is effectively isotropic and radially homogenous.

6. A method as defined in claim 5 wherein the fractional variation of the third shear modulus comprises a ratio of a difference between an estimated value of the third shear modulus at the first radial position and a reference value of the third shear modulus to the reference value of the third shear modulus, the reference value of the third shear modulus corresponds to a far-field value of the third shear modulus determined from the second flexural wave velocities assuming the formation is effectively isotropic and radially homogenous, the fractional variations of the second flexural wave velocities for the different wavenumbers include a first fractional variation of the second flexural wave velocity for a first wavenumber, the first fractional variation of the second flexural wave velocity comprises a ratio of a difference between a measured value and a reference value of the second flexural wave velocity for the first wavenumber to the reference value of the second flexural wave velocity for the first wavenumber, and the reference value of the second flexural wave velocity for the first wavenumber is determined assuming the formation is effectively isotropic and radially homogenous.

7. A method as defined in claim 1 further comprising:
determining respective first data kernels for the different wavenumbers using a Stoneley mode solution of the perturbation model;
determining the first weights based on the first data kernels;
determining respective second and third data kernels for the different wavenumbers using respective flexural mode solutions of the perturbation model; and
determining the second and third weights based on the respective second and third data kernels.

8. A method as defined in claim 1 wherein the perturbation model includes parameters to model the borehole casing but not a cement annulus between the borehole casing and the formation.

9. A system to determine a radial profile of shear parameters for a formation including a cased borehole, the system comprising:
a sonic tool to measure Stoneley waveforms and dipole sonic waveforms in the cased borehole; and
a radial profiling processor to:
determine a first radial profile for variations of a first shear modulus at a first set of radial positions from the borehole in a borehole cross-sectional plane of the formation, the first radial profile being determined based on a first weighted average of fractional variations of Stoneley wave velocities for different wavenumbers, the first weighted average being based on first weights determined using a perturbation model including parameters to model the borehole casing; and
determine respective second and third radial profiles of respective second and third shear moduli at respective second and third sets of radial positions from the borehole in respective first and second orthogonal borehole axial planes of the formation, the second radial profile being determined based on a second weighted average of fractional variations of first flexural wave velocities for different wavenumbers, the third radial profile being determined based on a third weighted average of fractional variations of second flexural wave velocities for different wavenumbers, the second and third weighted averages being based on respective second and third weights determined using the perturbation model, the first flexural wave velocities being associated with the first borehole axial plane of the formation, and the second flexural wave velocities being associated with the second borehole axial plane of the formation.

10. A system as defined in claim 9 wherein the perturbation model includes parameters to model the borehole casing but not a cement annulus between the borehole casing and the formation.

11. A non-transitory machine readable storage medium comprising
machine readable instructions which, when executed, cause a machine to at least:
measure Stoneley waveforms and dipole sonic waveforms in the cased borehole by a sonic tool;
determine a fractional variation of a first shear modulus at a first radial position from a cased borehole in a formation based on a first weighted average of fractional variations of Stoneley wave velocities for different wavenumbers, the first weighted average being based on first weights determined using a perturbation model including parameters to model the borehole casing;
determine fractional variations of second and third shear moduli at respective second and third radial positions from the borehole based on second and third weighted averages of fractional variations of respective first and second flexural wave velocities for different wavenumbers, the first and second flexural wave velocities associated with respective first and second orthogonal borehole axial planes of the formation, the second and third weighted averages being based on respective second and third weights determined using the perturbation model;
determining a radial profile of the first shear modulus at a set of radial positions from the borehole in a borehole cross-sectional plane of the formation based on fractional variations of the first shear modulus determined at the respective set of radial positions from the borehole;
determining respective radial profiles of the second and third shear moduli at respective second and third sets of radial positions from the borehole in the respective first and second orthogonal borehole axial planes of the formation based on respective fractional variations of the second and third shear moduli determined at the respective second and third sets of radial positions from the borehole;
determining respective radial profiles of the shear slownesses at the respective second and third sets of radial positions from the borehole in the respective first and second orthogonal borehole axial planes of the formation based on the respective radial profiles of the second and third shear moduli; and
determining the radial profile of shear parameters for the formation including the cased borehole; wherein the shear parameters comprise the shear moduli and the shear slowness.

12. A non-transitory storage medium as defined in claim 11 wherein the first shear modulus is associated with the borehole cross-sectional plane of the formation, and the second and third shear moduli are associated respectively with the first and second orthogonal borehole axial planes.

13. A non-transitory storage medium as defined in claim 12 wherein the first borehole axial plane is associated with a fast flexural shear velocity determinable from the first flexural wave velocities, and the second borehole axial plane is associated with a slow flexural shear velocity determinable from the second flexural wave velocities.

14. A non-transitory storage medium as defined in claim 11 wherein the fractional variation of the first shear modulus at the first radial position from the borehole comprises a ratio of a difference between an estimated value of the first shear modulus at the first radial position and a reference value of the first shear modulus to the reference value of the first shear modulus, the reference value of the first shear modulus corresponding to a far-field value of the first shear modulus determined from the Stoneley wave velocities assuming the formation is effectively isotropic and radially homogenous, the fractional variations of the Stoneley wave velocities for the different wavenumbers include a first fractional variation of the Stoneley wave velocity for a first wavenumber, the first fractional variation of the Stoneley wave velocity comprises a ratio of a difference between a measured value and a reference value of the Stoneley wave velocity for the first wavenumber to the reference value of the Stoneley wave velocity for the first wavenumber, and the reference value of the Stoneley wave velocity for the first wavenumber is determined assuming the formation is effectively isotropic and radially homogenous.

15. A non-transitory storage medium as defined in claim 11 wherein the fractional variations of the second and third shear moduli include a fractional variation of the second shear modulus and a fractional variation of the third shear modulus at a first radial position from the borehole, the fractional variation of the second shear modulus comprises a ratio of a difference between an estimated value of the second shear modulus at the first radial position and a reference value of the second shear modulus to the reference value of the second shear modulus, the reference value of the second shear modulus corresponding to a far-field value of the second shear modulus determined from the first flexural wave velocities assuming the formation is effectively isotropic and radially homogenous, the fractional variations of the first flexural wave velocities for the different wavenumbers include a first fractional variation of the first flexural wave velocity for a first wavenumber, the first fractional variation of the first flexural wave velocity comprises a ratio of a difference between a measured value and a reference value of the first flexural wave velocity for the first wavenumber to the reference value of the first flexural wave velocity for the first wavenumber, and the reference value of the first flexural wave velocity for the first wavenumber is determined assuming the formation is effectively isotropic and radially homogenous.

16. A non-transitory storage medium as defined in claim 15 wherein the fractional variation of the third shear modulus comprises a ratio of a difference between an estimated value of the third shear modulus at the first radial position and a reference value of the third shear modulus to the reference value of the third shear modulus, the reference value of the third shear modulus corresponds to a far-field value of the third shear modulus determined from the second flexural wave velocities assuming the formation is effectively isotropic and radially homogenous, the fractional variations of the second flexural wave velocities for the different wavenumbers include a first fractional variation of the second flexural wave velocity for a first wavenumber, the first fractional variation of the second flexural wave velocity comprises a ratio of a difference between a measured value and a reference value of the second flexural wave velocity for the first wavenumber to the reference value of the second flexural wave velocity for the first wavenumber, and the reference value of the second flexural wave velocity for the first wavenumber is determined assuming the formation is effectively isotropic and radially homogenous.

17. A non-transitory storage medium as defined in claim 11 wherein the machine readable instructions, when executed, further cause the machine to:
   determine respective first data kernels for the different wavenumbers using a Stoneley mode solution of the perturbation model;
   determine the first weights based on the first data kernels;
   determine respective second and third data kernels for the different wavenumbers using respective flexural mode solutions of the perturbation model; and
   determine the second and third weights based on the respective second and third data kernels.

18. A non-transitory storage medium as defined in claim 11 wherein the perturbation model includes parameters to model the borehole casing but not a cement annulus between the borehole casing and the formation.

* * * * *